US012611017B2

(12) United States Patent
Kim et al.

(10) Patent No.: US 12,611,017 B2
(45) Date of Patent: Apr. 28, 2026

(54) CARRY CASE FOR RECHARGEABLE EYEWEAR DEVICES

(71) Applicant: Snap Inc., Santa Monica, CA (US)

(72) Inventors: Jinwoo Kim, Los Angeles, CA (US); Jun Lin, Sherman Oaks, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/515,096

(22) Filed: Nov. 20, 2023

(65) Prior Publication Data

US 2024/0081500 A1    Mar. 14, 2024

Related U.S. Application Data

(63) Continuation of application No. 18/047,229, filed on Oct. 17, 2022, now Pat. No. 11,825,923, which is a
(Continued)

(51) Int. Cl.
*A45C 11/04* (2006.01)
*A45F 5/00* (2006.01)
(Continued)

(52) U.S. Cl.
CPC ............ *A45C 11/04* (2013.01); *H02J 7/0044* (2013.01); *H02J 7/342* (2020.01); *A45F 5/1541* (2025.01);
(Continued)

(58) Field of Classification Search
CPC .......... A45C 11/04; A45C 11/08; H02J 50/20; H02J 7/342; H02J 7/0044; H02J 50/10;
(Continued)

(56) References Cited

U.S. PATENT DOCUMENTS

| | | | |
|---|---|---|---|
| 2,794,085 A | 5/1957 | Angelis | |
| 4,456,346 A | 6/1984 | Beyer | |
| | | (Continued) | |

FOREIGN PATENT DOCUMENTS

| | | | | |
|---|---|---|---|---|
| CA | 2887596 A1 | 7/2015 | | |
| EP | 2596716 A1 * | 5/2013 | ............. | A45C 11/04 |
| | | (Continued) | | |

OTHER PUBLICATIONS

"U.S. Appl. No. 18/107,355, Response filed Oct. 3, 2023 to Non Final Office Action mailed Jul. 3, 2023", 12 pgs.
(Continued)

*Primary Examiner* — Rafael A Ortiz
(74) *Attorney, Agent, or Firm* — Schwegman Lundberg & Woessner, P.A.

(57) ABSTRACT

A carry case for an electronics-enabled eyewear device, such as smart glasses, has charging contacts that are movable relative to a storage chamber in which the eyewear device is receivable. The charging contacts are connected to a battery carried by the case for charging the eyewear device via contact coupling of the charging contacts to corresponding contact formations on an exterior of the eyewear device. The charging contacts are in some instances mounted on respective flexible walls defining opposite extremities of the storage chamber. The contact formations on the eyewear device are in some instances provided by hinge assemblies that couple respective temples to a frame of the eyewear device.

13 Claims, 14 Drawing Sheets

Related U.S. Application Data continuation of application No. 17/301,738, filed on Apr. 13, 2021, now Pat. No. 11,470,936, which is a continuation of application No. 16/115,286, filed on Aug. 28, 2018, now Pat. No. 10,993,515.

(60) Provisional application No. 62/647,064, filed on Mar. 23, 2018, provisional application No. 62/551,039, filed on Aug. 28, 2017.

(51) Int. Cl.

| | |
|---|---|
| *G06F 1/16* | (2006.01) |
| *H02J 7/00* | (2006.01) |
| *H02J 7/34* | (2006.01) |
| *H02J 50/10* | (2016.01) |
| *H01M 50/20* | (2021.01) |
| *H02J 50/70* | (2016.01) |

(52) U.S. Cl.
CPC ........... *G06F 1/1632* (2013.01); *H01M 50/20* (2021.01); *H02J 50/10* (2016.02); *H02J 50/70* (2016.02)

(58) Field of Classification Search
CPC ....... H02J 50/70; H01M 50/20; G06F 1/1632; A45F 2200/0541; A45F 5/1541; G02C 11/10
USPC ......... 206/5, 6, 5.1, 216; 351/158; 220/4.24; 362/103
See application file for complete search history.

(56) References Cited

U.S. PATENT DOCUMENTS

| | | | |
|---|---|---|---|
| 5,258,784 | A | 11/1993 | Baines |
| 5,606,743 | A | 2/1997 | Vogt et al. |
| 5,900,720 | A | 5/1999 | Kallman et al. |
| 5,946,071 | A | 8/1999 | Feldman |
| 6,038,295 | A | 3/2000 | Mattes |
| 6,091,546 | A | 7/2000 | Spitzer |
| 6,409,338 | B1 | 6/2002 | Jewell |
| 6,854,845 | B1 | 2/2005 | Goldman et al. |
| 6,980,909 | B2 | 12/2005 | Root et al. |
| 7,173,651 | B1 | 2/2007 | Knowles |
| 7,376,238 | B1 | 5/2008 | Rivas et al. |
| 7,411,493 | B2 | 8/2008 | Smith |
| 7,470,023 | B2 | 12/2008 | Glinert |
| 7,535,890 | B2 | 5/2009 | Rojas |
| 7,677,723 | B2 | 3/2010 | Howell et al. |
| 7,808,449 | B2 | 10/2010 | Neidrich et al. |
| 7,946,705 | B1 | 5/2011 | Hsu |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,432,124 | B2 | 4/2013 | Foster |
| 8,678,581 | B2 | 3/2014 | Blum |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,979,259 | B2 | 3/2015 | Haddock et al. |
| 8,985,320 | B2 | 3/2015 | Santarelli |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,443,227 | B2 | 9/2016 | Evans et al. |
| 9,482,882 | B1 | 11/2016 | Hanover et al. |
| 9,482,883 | B1 | 11/2016 | Meisenholder |
| 9,489,661 | B2 | 11/2016 | Evans et al. |
| 9,491,134 | B2 | 11/2016 | Rosen et al. |
| 9,726,904 | B1 | 8/2017 | Lin |
| 9,740,023 | B1 | 8/2017 | Ashwood |
| 9,952,452 | B1 | 4/2018 | Hanover et al. |
| 9,971,169 | B1 | 5/2018 | Lin |
| 10,514,559 | B1 | 12/2019 | Meisenholder |
| 10,591,745 | B1 | 3/2020 | Lin |
| 10,670,889 | B1 | 6/2020 | Hanover et al. |
| 10,993,515 | B1 | 5/2021 | Kim et al. |
| 11,188,123 | B1 | 11/2021 | Lin |
| 11,219,287 | B1 | 1/2022 | Kim et al. |
| 11,300,814 | B1 | 4/2022 | Meisenholder |
| 11,322,959 | B1 | 5/2022 | Ardisana, II et al. |
| 11,470,936 | B2 | 10/2022 | Kim et al. |
| 11,600,945 | B2 | 3/2023 | Hanover et al. |
| 11,659,908 | B2 | 5/2023 | Kim et al. |
| 11,825,923 | B2 | 11/2023 | Kim et al. |
| 11,973,292 | B2 | 4/2024 | Hanover et al. |
| 12,189,421 | B2 | 1/2025 | Lin |
| 12,251,003 | B2 | 3/2025 | Kim et al. |
| 12,424,788 | B2 | 9/2025 | Hanover et al. |
| 2005/0242771 | A1 | 11/2005 | Blum et al. |
| 2007/0132942 | A1 | 6/2007 | Zelazowski |
| 2008/0106694 | A1 | 5/2008 | Blum et al. |
| 2008/0129953 | A1 | 6/2008 | Blum et al. |
| 2009/0002626 | A1 | 1/2009 | Wakabayashi |
| 2009/0182688 | A1 | 7/2009 | Van et al. |
| 2009/0195747 | A1 | 8/2009 | Insua |
| 2009/0251660 | A1 | 10/2009 | Figler et al. |
| 2009/0296044 | A1 | 12/2009 | Howell et al. |
| 2010/0177277 | A1 | 7/2010 | Kokonaski et al. |
| 2010/0294675 | A1 | 11/2010 | Mangano |
| 2011/0058141 | A1 | 3/2011 | Cozzani |
| 2011/0075095 | A1 | 3/2011 | Waters |
| 2011/0102734 | A1 | 5/2011 | Howell et al. |
| 2011/0181238 | A1 | 7/2011 | Soar |
| 2011/0202598 | A1 | 8/2011 | Evans et al. |
| 2012/0155064 | A1 | 6/2012 | Waters |
| 2012/0176580 | A1 | 7/2012 | Sonsino |
| 2012/0203310 | A1 | 8/2012 | Pugh et al. |
| 2012/0209924 | A1 | 8/2012 | Evans et al. |
| 2012/0220234 | A1 | 8/2012 | Abreu |
| 2013/0164949 | A1 | 6/2013 | Riering-Czekalla et al. |
| 2014/0305814 | A1 | 10/2014 | Santarelli |
| 2015/0200554 | A1 | 7/2015 | Marks et al. |
| 2015/0230988 | A1 | 8/2015 | Chao et al. |
| 2018/0090958 | A1 | 3/2018 | Steger et al. |
| 2018/0123367 | A1* | 5/2018 | Higgins ............. H01R 13/2414 |
| 2018/0136491 | A1 | 5/2018 | Ashwood et al. |
| 2020/0241329 | A1 | 7/2020 | Hanover et al. |
| 2021/0298440 | A1 | 9/2021 | Kim et al. |
| 2022/0057830 | A1 | 2/2022 | Lin |
| 2022/0151356 | A1 | 5/2022 | Kim et al. |
| 2023/0054967 | A1 | 2/2023 | Kim et al. |
| 2023/0187875 | A1 | 6/2023 | Hanover et al. |
| 2023/0248130 | A1 | 8/2023 | Kim et al. |
| 2024/0235109 | A1 | 7/2024 | Hanover et al. |
| 2025/0204661 | A1 | 6/2025 | Kim et al. |

FOREIGN PATENT DOCUMENTS

| | | |
|---|---|---|
| FR | 2114282 | 6/1972 |
| GB | 384198 | 12/1932 |
| WO | WO-2013103985 A2 | 7/2013 |

OTHER PUBLICATIONS

"U.S. Appl. No. 18/299,977, Non Final Office Action mailed Nov. 9, 2023", 14 pgs.
"U.S. Appl. No. 18/107,355, Response filed Dec. 14, 2023 to Final Office Action mailed Oct. 16, 2023", 12 pgs.
"U.S. Appl. No. 18/107,355, Notice of Allowance mailed Jan. 10, 2024", 9 pgs.
"U.S. Appl. No. 18/299,977, Response filed Mar. 11, 2024 to Non Final Office Action mailed Nov. 9, 2023", 10 pgs.
"U.S. Appl. No. 17/453,422, Non Final Office Action mailed May 21, 2024", 15 pgs.
"U.S. Appl. No. 18/299,977, Non Final Office Action mailed Jun. 18, 2024", 29 pgs.

(56)            References Cited

OTHER PUBLICATIONS

"U.S. Appl. No. 17/453,422, Response filed Jul. 25, 2024 to Non Final Office Action mailed May 21, 2024", 13 pgs.
"U.S. Appl. No. 17/453,422, Notice of Allowance mailed Sep. 5, 2024", 7 pgs.
"U.S. Appl. No. 18/616,922, Non Final Office Action mailed Oct. 9, 2024", 17 pgs.
"U.S. Appl. No. 18/299,977, Response filed Oct. 18, 2024 to Non Final Office Action mailed Jun. 18, 2024", 12 pgs.
"Amendment and Response to Non Final Office Action: U.S. Appl. No. 15/339,526, Response filed Jun. 13, 2017 to Non Final Office Action mailed Mar. 13, 2017", 13 pgs.
"U.S. Appl. No. 14/687,308, Final Office Action mailed Feb. 1, 2016", 12 pgs.
"U.S. Appl. No. 14/687,308, Non Final Office Action mailed May 29, 2015", 9 pgs.
"U.S. Appl. No. 14/687,308, Notice of Allowance mailed Aug. 3, 2016", 13 pgs.
"U.S. Appl. No. 14/687,308, Response filed Jun. 24, 2016 to Final Office Action mailed Feb. 1, 2016", 18 pgs.
"U.S. Appl. No. 14/687,308, Response filed Oct. 28, 2015 to Non Final Office Action mailed May 29, 2015", 20 pgs.
"U.S. Appl. No. 14/687,362, Non Final Office Action mailed Jan. 6, 2016", 8 pgs.
"U.S. Appl. No. 14/687,362, Non Final Office Action mailed May 29, 2015", 7 pgs.
"U.S. Appl. No. 14/687,362, Notice of Allowance mailed Sep. 6, 2016", 7 pgs.
"U.S. Appl. No. 14/687,362, Response filed Jun. 3, 2016 to Non Final Office Action mailed Jan. 6, 2016", 14 pgs.
"U.S. Appl. No. 14/687,362, Response filed Oct. 28, 2015 to Non Final Office Action mailed May 29, 2015", 16 pgs.
"U.S. Appl. No. 14/869,149 Amendment and Response filed Mar. 16, 2017 to Non Final Office Action mailed Dec. 5, 2016", 20 pgs.
"U.S. Appl. No. 14/869,149, Corrected Notice of Allowance mailed Apr. 17, 2017", 2 pgs.
"U.S. Appl. No. 14/869,149, Non Final Office Action mailed Dec. 5, 2016", 14 pgs.
"U.S. Appl. No. 14/869,149, Notice of Allowance mailed Mar. 24, 2017", 7 pgs.
"U.S. Appl. No. 14/869,149, PTO Response to Rule 312 Communication mailed Jun. 29, 2017", 2 pgs.
"U.S. Appl. No. 15/339,526, Final Office Action mailed Sep. 14, 2017", 11 pgs.
"U.S. Appl. No. 15/339,526, Non Final Office Action mailed Mar. 13, 2017", 6 pgs.
"U.S. Appl. No. 15/339,526, Notice of Allowance mailed Dec. 11, 2017", 18 pgs.
"U.S. Appl. No. 15/339,526, Response filed Nov. 13, 2017 to Final Office Action mailed Sep. 14, 2017", 8 pgs.
"U.S. Appl. No. 15/339,537, Advisory Action mailed Feb. 5, 2018", 3 pgs.
"U.S. Appl. No. 15/339,537, Advisory Action mailed Jun. 26, 2019", 3 pgs.
"U.S. Appl. No. 15/339,537, Corrected Notice of Allowability mailed Nov. 13, 2019", 2 pgs.
"U.S. Appl. No. 15/339,537, Final Office Action mailed Mar. 22, 2019", 13 pgs.
"U.S. Appl. No. 15/339,537, Final Office Action mailed Nov. 17, 2017", 13 pgs.
"U.S. Appl. No. 15/339,537, Non Final Office Action mailed Mar. 14, 2017", 5 pgs.
"U.S. Appl. No. 15/339,537, Non Final Office Action mailed Aug. 10, 2018", 13 pgs.
"U.S. Appl. No. 15/339,537, Notice of Allowance mailed Aug. 26, 2019", 7 pgs.
"U.S. Appl. No. 15/339,537, Response filed Jan. 17, 2018 to Final Office Action mailed Nov. 17, 2017", 12 pgs.
"U.S. Appl. No. 15/339,537, Response filed May 20, 2019 to Final Office Action mailed Mar. 22, 2019", 14 pgs.
"U.S. Appl. No. 15/339,537, Response filed Jul. 18, 2017 to Non Final Office Action mailed Mar. 14, 2017", 11 pgs.
"U.S. Appl. No. 15/339,537, Response filed Nov. 8, 2018 to Non Final Office Action mailed -Aug. 10, 2018", 16 pgs.
"U.S. Appl. No. 15/642,878, Non Final Office Action mailed Sep. 18, 2017", 12 pgs.
"U.S. Appl. No. 15/642,878, Notice of Allowance mailed Jan. 22, 2018", 11 pgs.
"U.S. Appl. No. 15/642,878, Response filed Dec. 8, 2017 to Non Final Office Action mailed Sep. 18, 2017", 17 pgs.
"U.S. Appl. No. 15/892,610, Non Final Office Action mailed Sep. 13, 2019", 11 pgs.
"U.S. Appl. No. 15/892,610, Notice of Allowance mailed Jan. 24, 2020", 8 pgs.
"U.S. Appl. No. 15/892,610, Response filed Dec. 12, 2019 to Non Final Office Action mailed Sep. 13, 2019", 10 pgs.
"U.S. Appl. No. 15/892,610, Response filed Jun. 21, 2019 to Restriction Requirement mailed Apr. 25, 2019", 7 pgs.
"U.S. Appl. No. 15/892,610, Restriction Requirement mailed Apr. 25, 2019", 6 pgs.
"U.S. Appl. No. 15/949,852, Non Final Office Action mailed Jul. 25, 2019", 5 pgs.
"U.S. Appl. No. 15/949,852, Notice of Allowance mailed Nov. 6, 2019", 7 pgs.
"U.S. Appl. No. 15/949,852, Response filed Oct. 24, 2019 to Non-Final Office Action mailed Jul. 25, 2019", 8 pgs.
"U.S. Appl. No. 16/115,273, Final Office Action mailed Dec. 10, 2020", 13 pgs.
"U.S. Appl. No. 16/115,273, Non Final Office Action mailed Apr. 1, 2021", 12 pgs.
"U.S. Appl. No. 16/115,273, Non Final Office Action mailed Apr. 30, 2020", 11 pgs.
"U.S. Appl. No. 16/115,273, Notice of Allowance mailed Aug. 17, 2021", 7 pgs.
"U.S. Appl. No. 16/115,273, Response filed Mar. 10, 2021 to Final Office Action mailed Dec. 10, 2020", 10pgs.
"U.S. Appl. No. 16/115,273, Response filed Jun. 18, 2021 to Non Final Office Action mailed Apr. 1, 2021", 10 pgs.
"U.S. Appl. No. 16/115,273, Response filed Aug. 31, 2020 to Non Final Office Action mailed Apr. 30, 2020", 11 pgs.
"U.S. Appl. No. 16/115,273, Supplemental Notice of Allowability mailed Aug. 27, 2021", 2 pgs.
"U.S. Appl. No. 16/115,286, Examiner Interview Summary mailed Jul. 20, 2020", 3 pgs.
"U.S. Appl. No. 16/115,286, Final Office Action mailed Sep. 14, 2020", 11 pgs.
"U.S. Appl. No. 16/115,286, Non Final Office Action mailed May 4, 2020", 14 pgs.
"U.S. Appl. No. 16/115,286, Notice of Allowance mailed Jan. 6, 2021", 7 pgs.
"U.S. Appl. No. 16/115,286, Response filed Apr. 21, 2020 to Restriction Requirement mailed Jan. 21, 2020", 9 pgs.
"U.S. Appl. No. 16/115,286, Response filed Aug. 4, 2020 to Non Final Office Action mailed May 4, 2020", 13 pgs.
"U.S. Appl. No. 16/115,286, Response filed Dec. 14, 2020 to Final Office Action mailed Sep. 14, 2020", 8 pgs.
"U.S. Appl. No. 16/115,286, Restriction Requirement mailed Jan. 21, 2020", 8 pgs.
"U.S. Appl. No. 16/696,499, Corrected Notice of Allowability mailed Dec. 30, 2021", 2 pgs.
"U.S. Appl. No. 16/696,499, Notice of Allowance mailed Dec. 15, 2021", 9 pgs.
"U.S. Appl. No. 16/790,971, 312 Amendment filed Oct. 14, 2021", 5 pgs.
"U.S. Appl. No. 16/790,971, Corrected Notice of Allowability mailed Aug. 9, 2021", 2 pgs.
"U.S. Appl. No. 16/790,971, Non Final Office Action mailed Apr. 19, 2021", 11 pgs.
"U.S. Appl. No. 16/790,971, Notice of Allowance mailed Jul. 27, 2021", 5 pgs.
"U.S. Appl. No. 16/790,971, Preliminary Amendment filed Mar. 30, 2020", 6 pgs.

(56)        References Cited

OTHER PUBLICATIONS

"U.S. Appl. No. 16/790,971, PTO Response to Rule 312 Communication mailed Oct. 28, 2021", 2 pgs.

"U.S. Appl. No. 16/790,971, Response filed Jul. 14, 2021 to Non Final Office Action mailed Apr. 19, 2021", 12 pgs.

"U.S. Appl. No. 16/853,501, Non Final Office Action mailed Jun. 9, 2022", 17 pgs.

"U.S. Appl. No. 16/853,501, Notice of Allowance mailed Nov. 4, 2022", 9 pgs.

"U.S. Appl. No. 16/853,501, Response filed Sep. 7, 2022 to Non Final Office Action mailed Jun. 9, 2022", 11 pgs.

"U.S. Appl. No. 17/301,738, Corrected Notice of Allowability mailed Jun. 29, 2022", 2 pgs.

"U.S. Appl. No. 17/301,738, Notice of Allowance mailed Jun. 15, 2022", 8 pgs.

"U.S. Appl. No. 17/301,738, Preliminary Amendment filed Jun. 17, 2021", 8 pgs.

"U.S. Appl. No. 17/535,158, Non Final Office Action mailed Nov. 10, 2022", 15 pgs.

"U.S. Appl. No. 17/535,158, Notice of Allowance mailed Jan. 19, 2023", 8 pgs.

"U.S. Appl. No. 17/535,158, Preliminary Amendment filed Feb. 8, 2022", 7 pgs.

"U.S. Appl. No. 17/535,158, Response filed Dec. 13, 2022 to Non Final Office Action mailed Nov. 10, 2022", 8 pgs.

"U.S. Appl. No. 17/535,158, Supplemental Notice of Allowability mailed May 1, 2023", 2 pgs.

"U.S. Appl. No. 18/047,229, Advisory Action mailed Apr. 11, 2023", 3 pgs.

"U.S. Appl. No. 18/047,229, Corrected Notice of Allowability mailed Oct. 26, 2023", 2 pgs.

"U.S. Appl. No. 18/047,229, Final Office Action mailed Mar. 15, 2023", 9 pgs.

"U.S. Appl. No. 18/047,229, Non Final Office Action mailed Feb. 8, 2023", 9 pgs.

"U.S. Appl. No. 18/047,229, Notice of Allowance mailed Jul. 19, 2023", 7 pgs.

"U.S. Appl. No. 18/047,229, Preliminary Amendment filed Oct. 31, 2022", 7 pgs.

"U.S. Appl. No. 18/047,229, Response filed Mar. 2, 2023 to Non Final Office Action mailed Feb. 8, 2023", 11 pgs.

"U.S. Appl. No. 18/047,229, Response filed Mar. 28, 2023 to Final Office Action mailed Mar. 15, 2023", 9 pgs.

"U.S. Appl. No. 18/107,355, Final Office Action mailed Oct. 16, 2023", 12 pgs.

"U.S. Appl. No. 18/107,355, Non Final Office Action mailed Jul. 3, 2023", 21 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

"U.S. Appl. No. 18/299,977, Notice of Allowance mailed Nov. 14, 2024", 8 pgs.

"U.S. Appl. No. 18/616,922, Final Office Action mailed Mar. 13, 2025", 12 pgs.

"U.S. Appl. No. 18/616,922, Notice of Allowance mailed Jun. 3, 2025", 9 pgs.

"U.S. Appl. No. 18/616,922, Response filed Jan. 7, 2025 to Non Final Office Action mailed Oct. 9, 2024", 10 pgs.

"U.S. Appl. No. 18/616,922, Response filed May 12, 2025 to Final Office Action mailed Mar. 13, 2025", 8 pgs.

* cited by examiner

CARRY CASE FOR RECHARGEABLE EYEWEAR DEVICES

PRIORITY CLAIMS

This application is a continuation of U.S. patent application Ser. No. 18/047,229, filed on Oct. 17, 2022, and issued as U.S. Pat. No. 11,825,923, which is a continuation of U.S. patent application Ser. No. 17/301,738, filed on Apr. 13, 2021, and issued as U.S. Pat. No. 11,470,936, which is a continuation of U.S. patent application Ser. No. 16/115,286, filed on Aug. 28, 2018, and issued as U.S. Pat. No. 10,993, 515, which claims the benefit of priority to U.S. Provisional Application Ser. No. 62/647,064, filed on Mar. 23, 2018; and U.S. Provisional Application Ser. No. 62/551,039, filed on Aug. 28, 2017, each of which are hereby incorporated by reference herein in their entireties.

TECHNICAL FIELD

The subject matter disclosed herein relates generally to electronics-enabled eyewear, to holders for such eyewear, and to methods, apparatuses, systems, and devices for charging onboard electronic components of such eyewear.

BACKGROUND

Electronics-enabled eyewear devices, such as smart glasses, typically have integrated electronics requiring an onboard power supply in the form of a battery. Such batteries are usually relatively small and require regular recharging. Regular connection to a charging outlet for these purposes, however, can reduce user satisfaction with such devices.

Some recently introduced eyewear device holders or carry cases are multifunctional in that they not only stow the glasses for safe transportation, but at the same time serve as a docking station for charging of the smart glasses battery. Establishing a charging connection between the case and the eyewear device, however, can be problematic in that precise location of the eyewear device during insertion is required to achieve positive connection of conventional male-female type charging connectors (e.g., mini USB or iPhone connectors).

BRIEF DESCRIPTION OF THE DRAWINGS

The appended drawings merely illustrate example embodiments of the present disclosure and cannot be considered as limiting its scope. In the drawings.

Figure 1:
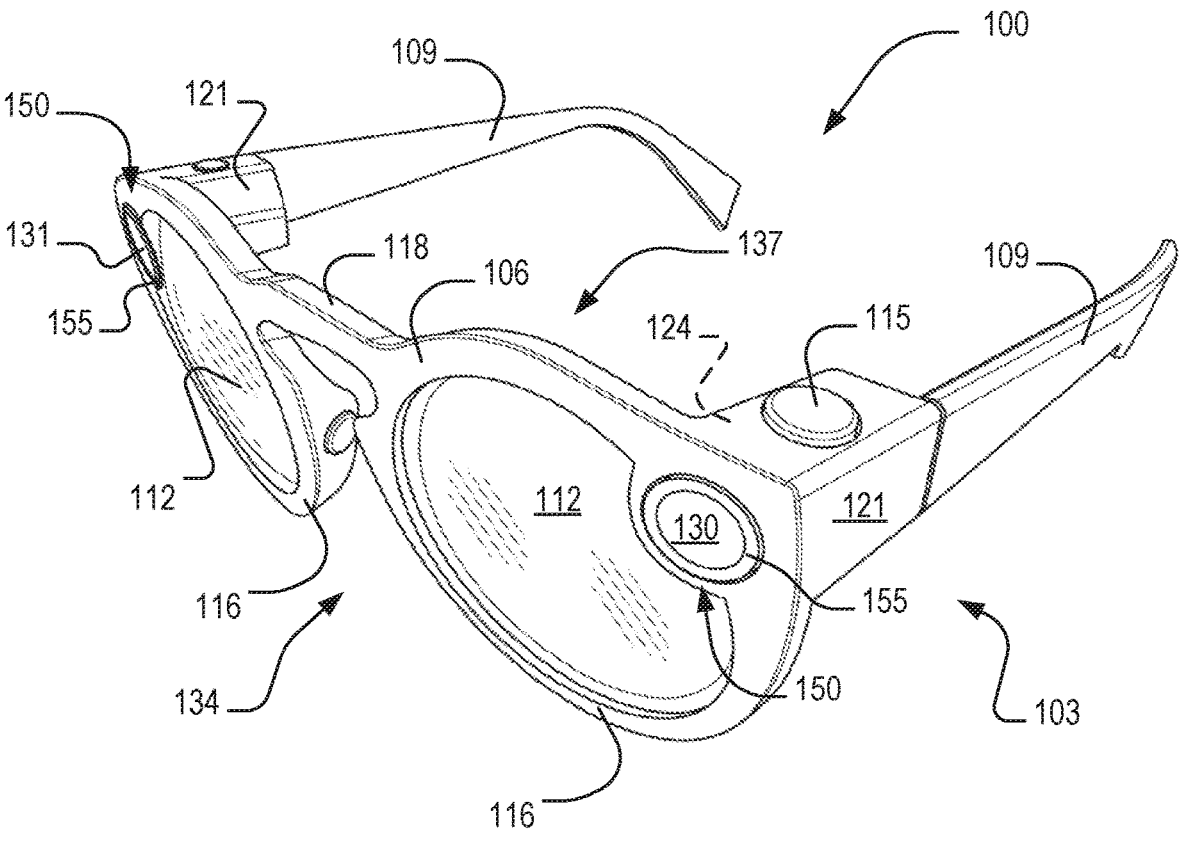
FIG. 1 is a schematic three-dimensional view of an electronics-enabled eyewear device in the form of a pair of smart glasses, according to an example embodiment.

The headings provided herein are merely for convenience and do not necessarily affect the scope or meaning of the terms used.

OVERVIEW

One aspect of the disclosure provides a carry case for an electronics-enabled eyewear device, the case having at least one contact charging element exposed to a storage cavity or chamber in which the eyewear device is receivable, the contact charging element being connected to a battery carried by the case for charging the eyewear device via contact coupling of the charging contact to a corresponding contact formation on an exterior of the eyewear device.

The disclosure in some embodiments provides a carry case for an electronics-enabled eyewear device, the case comprising:

a case body that defines a storage chamber for holding an eyewear device;

a power arrangement configured to provide electrical power for charging an onboard battery of the eyewear device while the eyewear device is held in the storage chamber; and a contact charging mechanism that provides one or more contact charging elements mounted on the case body in exposure to the storage chamber for contact engagement with a contact formation on the eyewear device, the one or more charging elements being conductively connected to the power arrangement to enable charging of the eyewear device via the contact charging mechanism.

Contact charging is to be distinguished in this description from conventional male/female charging mechanisms or interlocking mechanisms in which one component is at least partially received in a socket defined by the other component, or in which the charging components mechanically interlock. In contrast, a contact charging mechanism allows for electrical conduction across a contact interface in which two contact surfaces touch without being received one within the other. A contact charging mechanism may thus provide two substantially flat surfaces (or two complementarily curved surfaces) in flush contact, without being mechanically restrained at the point of engagement.

In some embodiments, the contact charging mechanism comprises two separate contact charging elements defining respective contact surfaces for contact engagement with separate respective contact formations on the eyewear device.

In some embodiments, the storage chamber may be defined at least in part by one or more flexible walls forming part of the body of the carry case. In other embodiments, the case may be substantially rigid, with the storage chamber being defined substantially entirely by rigid components and having a substantially consistent shape.

In some embodiments, both the contact charging element of the case and the contact formation of the eyewear device can be of a metal material. In some embodiments, a magnetic element may be provided on (or incorporated in) at least one of the contact charging element and the contact formation, to facilitate contact engagement by magnetic action. In some embodiments, each contact charging element comprises a magnet with an electrically conductive outer surface, for example provided by a metal plating or coating.

In some embodiments, the contact formations of the eyewear device are inaccessible from the exterior of the device when the eyewear device is in a wearable mode, being exposed for contact coupling when the eyewear device is disposed to a collapsed mode. In one such embodiment, the contact formations are provided by a pair of hinge assemblies providing articulated coupling of the respective temples to the frame.

In other embodiments, the contact formations of the eyewear device are exposed on the exterior of the device both in the wearable mode and in the collapsed mode. The contact formations are provided on a front surface of an eyewear frame forming part of the body. In one such embodiment, the contact formations define forward prominences on the front side of the eyewear frame, providing those parts of the eyewear device projecting furthest from the eyewear frame in a direction of view of the eyewear device. In some such example embodiments, the contact formations are provided as part of a housing defined by the eyewear frame for one or more electronic components.

In one example embodiment, the contact formations are provided by barrel-shaped trim components for a camera formation or a camera analog formation, such that a contact surface provided by each of the contact formations comprises an annular face directed forwards away from the eyewear frame.

In some embodiments, the contact charging elements comprises a pair of contact charging elements mounted on respective flexible walls at opposite extremities of the storage chamber. Each contact charging element in some embodiments comprises a metal tab or detail piece located on a flexible end wall that abut or is proximate to a corresponding lateral extremity of the eyewear device when it is placed in the storage chamber.

In other embodiments, the contact charging elements comprise a pair of contact pads mounted on a rigid wall that at least partially defines the storage chamber. Each contact pad may define a respective substantially flat contact surface that is greater in area than a respective contact surface of a corresponding contact formation on the eyewear device. The contact pads are in some embodiments of a non-metallic, electrically conductive material. In some such embodiments, the contact pads are conductive elastomeric components, for example being formed by conductive silicone compacted with metal fillings.

In some embodiments, each of the pair of contact pads may have a vertical extent (by which is meant a direction extending transversely to a side to side direction of the eyewear device when received in the storage chamber) such as to allow contact engagement between the pair of contact pads and corresponding contact formations on the eyewear device in either of two opposite vertical orientations in which the eyewear device is located in the storage chamber with the contact formations facing towards the contact pads. With vertical orientation of the eyewear device is meant whether the top on the bottom of the eyewear frame faces in a particular direction, the two opposite vertical orientations for example being an upright orientation and an inverted orientation.

Instead, or in addition, the contact charging mechanism in some embodiments comprises two pairs of contact pads mounted on opposite internal walls of the storage chamber, such that a pair of contact formations on a common side of the eyewear device is engaged with the contact charging mechanism (via one of the two pairs of contact pads), regardless of which one of the opposite walls bears against the side of the eyewear device on which the contact formations are mounted.

It will be appreciated that in embodiments in which a pair of contact pads are mounted on each of a pair of opposite walls defining the storage chamber, in combination with each of the contact pads having a sufficient length to allow engagement of a particular one of the pair of contact pads with the eyewear device's contact formations in two different orientations, the contact mechanism is configured for allowing contact engagement with the eyewear device in any one of four different orientations of the eyewear device in the storage chamber. In other embodiments, the case may provide four contact pads provided on each of the pair of opposed internal walls of the storage chamber, the eight contact pads being arranged to provide for contact engagement by each of the eyewear device's contact formations with a respective contact pad, in any one of four different orientations of the eyewear device in the storage chamber.

In some embodiments, the power arrangement comprises a battery housed by the case body, each pair of contact charging elements being connected to the power arrangement such as to have opposite polarities during charging of the eyewear device. The battery is in some embodiments connected by respective conductive paths to the contact charging elements such as to form an interrupted charging circuit that is closable by insertion of the eyewear device in the storage chamber. When thus inserted in the storage chamber in a charging configuration, each contact charging element of the case is coupled with a respective contact formation (e.g., the respective hinges or camera housing barrel trims) on the eyewear device.

Instead, or in addition, the power arrangement in some embodiments comprises a charging port housed by the body for connection to an external power source. In some such embodiments, the charging port is conductively coupled to the contact charging elements to enable charging of the onboard battery of the eyewear device by the external power source. In some such embodiments, the case has no battery and charging is exclusively by means of external power. In other embodiments, however, the charging port is conductively coupled to the battery of the case such as to enable charging of the battery by the external power source via the charging port.

Another aspect of the disclosure provides for a kit comprising an eyewear device and a complementary case, such as that described above. Yet a further aspect of the disclosure provides for an eyewear device configured for recharging of an onboard battery via contact coupling with an external power source via contact formations exposed as on an exterior of the eyewear device.

DETAILED DESCRIPTION

The description that follows includes devices, systems, methods, techniques, instruction sequences, and computing machine program products that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

FIG. 1 shows a front perspective view of an eyewear device 100 in the example form of a pair of smart glasses that is shaped and configured for reception in a complementary carry case (e.g., a wallet-style folding case 200 (FIG. 2) or, in other embodiments, a rigid clamshell case 1100 (FIG. 11 or 12)) such as to enable charging of onboard electronics forming part of the eyewear device 100 while the eyewear device 100 is held by the portable case 200. The eyewear device 100 includes a body 103 comprising a front piece or frame 106 and a pair of temples 109 connected to the frame 106 for supporting the frame 106 in position on a user's face when the eyewear device 100 is worn. The frame 106 can be made from any suitable material such as plastics or metal, including any suitable shape memory alloy.

The eyewear device 100 has a pair of optical elements in the form of a pair of lenses 112 held by corresponding optical element holders in the form of a pair of rims 116 forming part of the frame 106. The rims 116 are connected by a bridge 118. In other embodiments, of one or both of the optical elements can be a display, a display assembly, or a lens and display combination. The eyewear device can in such embodiments provide a virtual reality headset, or an augmented reality display.

The frame 106 includes a pair of end pieces 121 defining lateral end portions of the frame 106. In this example, a variety of electronics components are housed in one or both of the end pieces 121, as discussed in more detail below. In some embodiments, the frame 106 is formed of a single piece of material, so as to have a unitary or monolithic construction.

The temples 109 are coupled to the respective end pieces 121. In this example, the temples 109 are coupled to the frame 106 by respective hinges so as to be hingedly movable between a wearable mode (as shown in FIG. 1) and a collapsed mode in which the temples 109 are pivoted towards the frame 106 to lie substantially flat against it (see, for example, FIGS. 3 and 4). In other embodiments, the temples 109 can be coupled to the frame 106 by any suitable means. Each of the temples 109 includes a front portion of that is coupled to the frame 106 and a suitable rear portion for coupling to the ear of the user, such as the curved earpiece illustrated in the example embodiment of FIG. 1.

In this description, directional terms such as front, back, forwards, rearwards, outwards, inwards, horizontal, and vertical are to be understood with reference to a direction of view of a user when the eyewear device 100 is worn. Thus, the frame 106 has an outwardly directed front side 134 facing away from the user when worn, and an opposite inwardly directed rear side 137 side facing towards the user when the eyewear device 100 is worn. Similarly, the terms horizontal and vertical as used in this description with reference to different features of the eyewear device 100 are to be understood as corresponding to the orientation of the eyewear device 100 when it is level on the face of a user looking forwards. A horizontal or lateral direction of the eyewear device 100 thus extends more or less between the end pieces 121, while a vertical or upright direction of the eyewear device 100 extends transversely to the horizontal direction, such that the lenses 112 have a more or less vertical or upright orientation.

The eyewear device 100 has onboard electronics 124 including a computing device, such as a computer, which can in different embodiments be of any suitable type so as to be carried by the body 103. In some embodiments, various components comprising the onboard electronics 124 are at least partially housed in one or both of the temples 109. In the present embodiment, various components of the onboard electronics 124 are housed in the lateral end pieces 121 of the frame 106. The onboard electronics 124 includes one or more processors with memory, wireless communication circuitry, and a power source (this example embodiment being a rechargeable battery, e.g. a lithium-ion battery). The onboard electronics 124 comprises low-power, high-speed circuitry, and, in some embodiments, a display processor. Various embodiments may include these elements in different configurations or integrated together in different ways.

As mentioned, the onboard electronics 124 includes a rechargeable battery. In some embodiments, the battery is disposed in one of the temples 109. In this example embodiment, however, the battery is housed in one of the end pieces 121, being electrically coupled to the remainder of the onboard electronics 124. The battery is further conductively connected to metal hinge pieces at both end pieces 121, to enable charging of the battery via the hinges. In some embodiments, such as those described with reference to FIGS. 3 and 4, hinge assemblies providing respective articulated connections between the temples 109 and the end pieces 121 are shaped and positioned such that when the glasses are in the collapsed mode (FIG. 3), at least one metal element of each hinge assembly is exposed on the exterior of the eyewear device 100 to provide a contact formation for contact engagement with to cooperating contact charging elements of a case (e.g., charging contacts 202 of case 200).

The eyewear device 100 is camera-enabled, in this example comprising a camera 130 mounted in one of the end pieces 121 and facing forwards so as to be aligned more or less with the direction of view of a wearer of the eyewear device 100. The camera 130 is configured to capture digital as well as digital video content. Operation of the camera 130 is controlled by a camera controller provided by the onboard electronics 124, image data representative of images or video captured by the camera 130 being temporarily stored on a memory forming part of the onboard electronics 124. In some embodiments, the eyewear device 100 can have a pair of cameras 130, e.g. housed by the respective end pieces 121.

In some embodiments, the eyewear device 100 can include a pseudo-camera formation or camera analog formation 131 in one of the end pieces 121, and a camera 130 in the other end piece 121. With camera analog is meant a formation on the eyewear frame that has the external shape and appearance of a camera lens, without in fact having an associated camera device, thus providing a substantially symmetrical appearance to the frame 106 even though only one of the end pieces 121 houses a camera 130. In one example embodiment, a cameral analog formation 131 houses a light sensor co-operatively coupled to the camera 130. The description herein with respect to aspects of camera housings and trim are to be understood as extending equally to such pseudo-camera or camera analog formations. For this description a camera 130 and a camera analog formation 131 are alike described as having respective associated camera housings 150.

In some embodiments, such as in the example embodiments described below with reference to FIGS. 7-13, one or more contact formations conductively coupled to the onboard battery of the eyewear device 100 are provided on the front side 134 of the frame 106. In particular, in the example embodiments of FIGS. 7-13, a pair of contact formations are provided by a pair of conductive metal barrels 155 incorporated in respective camera housings 150 in the opposite end piece 121. Each barrel 155 is circular cylindrical and is located concentrically around the lens of the associated camera 130, thus providing an annular trim that stands proud of the camera lens. An annular outer end face of each barrel 155 thus protrudes from the camera lens and from the surrounding front surface 134 of the frame 106. In this manner, the barrels 155 serve the multiple functions of protecting the camera lenses against scratching, providing an aesthetic trim for the respective cameras 130, and providing a prominent and protruding contact surface for engagement with complimentary contact charging elements of a charging case, as will be described in greater detail with reference to FIG. 7-13.

The eyewear device 100 further includes one or more input and output devices permitting communication with and control of the camera 130. In particular, the eyewear device 100 includes one or more input mechanisms for enabling user control of one or more functions of the eyewear device 100. In this embodiment, the input mechanism comprises a button 115 mounted on the frame 106 so as to be accessible on top of one of the end pieces 121 for pressing by the user.

Figure 2:
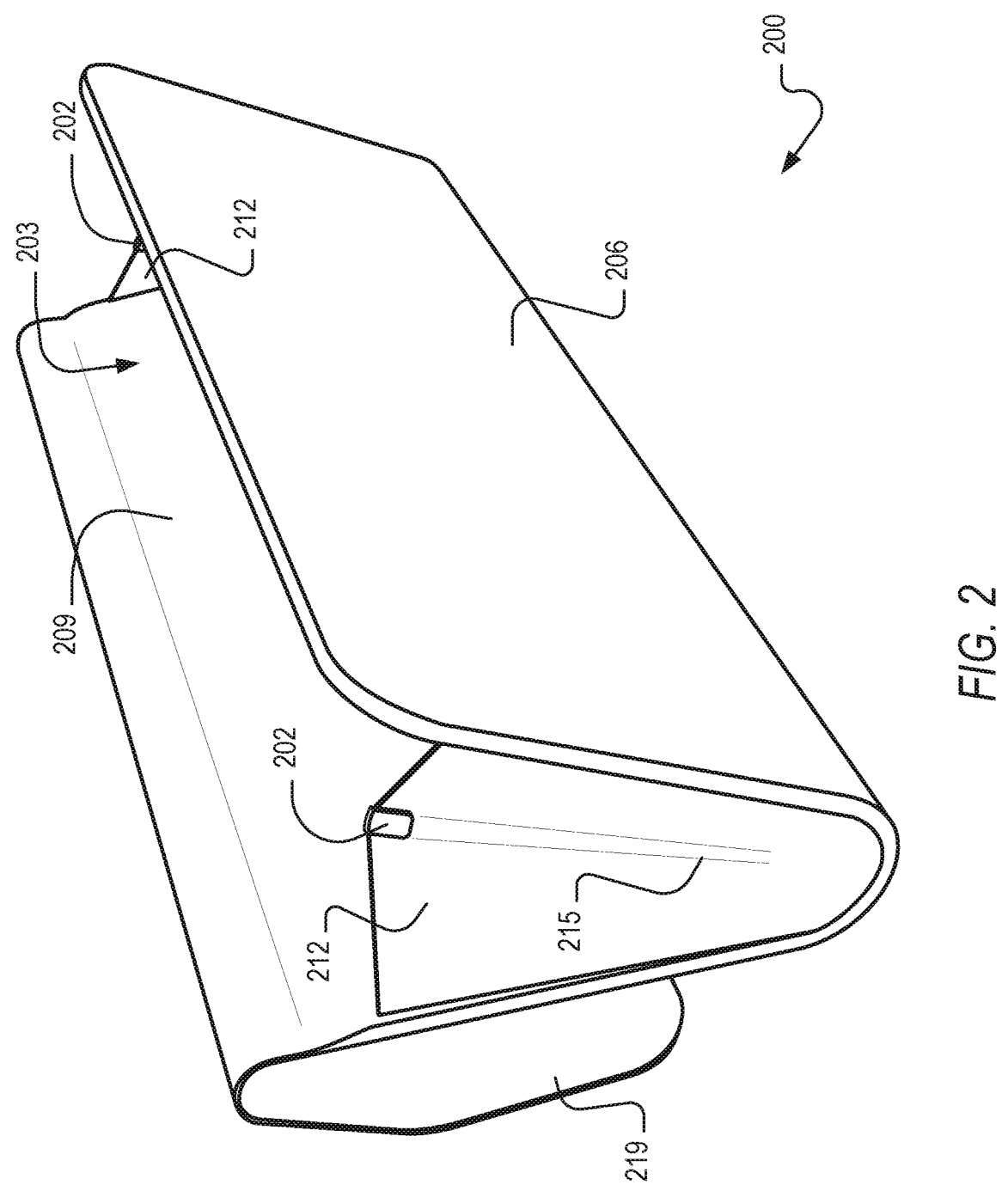
FIG. 2 is a three-dimensional oblique front view of a carry case for an eyewear device, according to an example embodiment in which contact charging elements carried by the case are mounted on flexible side walls for contact engagement with complementary contact formations on opposite lateral ends of an eyewear device.
Figure 3:
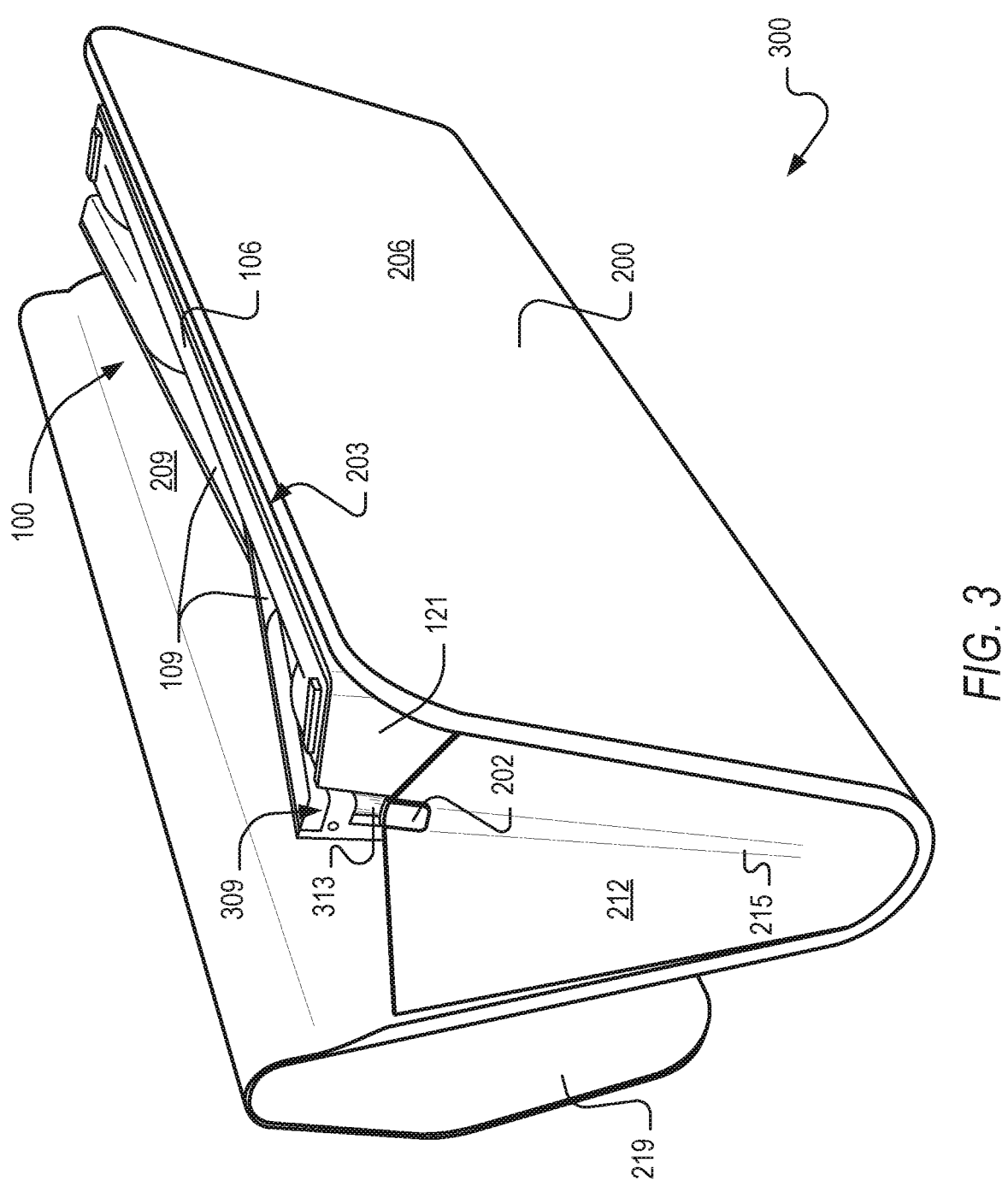
FIG. 3 is a three-dimensional oblique front view of an example eyewear kit comprising an eyewear device and a complementary carry case consistent with the example embodiment of FIG. 2, the eyewear device being shown received in the carry case in a charging configuration in which metal contact charging elements on flexible end walls of the carry case are in contact engagement with metal hinge pieces forming part of the eyewear device.
Figure 4:
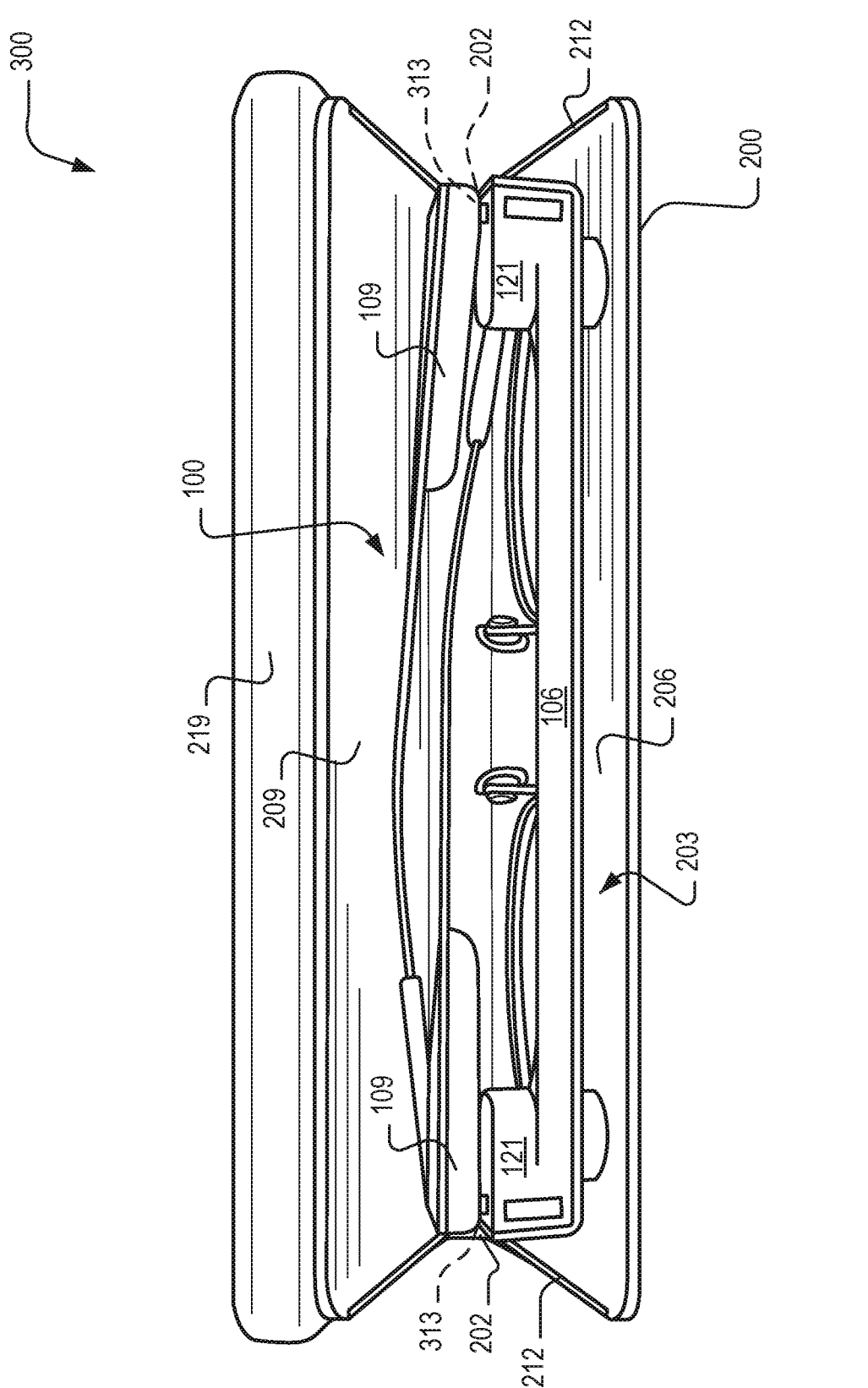
FIG. 4 is a three-dimensional top view of the kit of FIG. 3.

Turning now to FIG. 2, therein is shown a portable container in the form of a foldable, wallet-type carry case 200 for holding and charging the eyewear device 100. In this example embodiment, contact formations for charging of the eyewear device 100 are located at lateral ends of the eyewear device 100, for example being incorporated in respective hinge mechanisms connecting the temples 109 to the frame 106. The case 200 has a body that defines a containing cavity in form of a storage chamber 203 shaped to receive and hold the eyewear device 100 in the collapsed mode (FIGS. 3 and 4). In this example embodiment, the chamber 203 is shaped such that the eyewear device 100 is receivable in the chamber 203 in either of two different horizontal orientations in which an upper surface of the frame 106 is directed outwards from a mouth of chamber 203 (one of these orientations being shown in FIGS. 3 and 4).

The chamber 203 is in this example defined by two rigid sidewalls in the form of a generally rectangular front wall 206 and a corresponding rear wall 209 that is opposed to and transversely spaced from the front wall 206. Flexible end walls 212 extend transversely between the front wall 206 the rear wall 209 at opposite end edges thereof. In the condition shown in FIG. 2, the chamber 203 has an open mouth through which the smart glasses 100 can be inserted, after which a fold-over lid 219 can be moved to a closed position to enclose the glasses 100 in the case 200.

Note that, because the end walls 212 or flaps are flexible, the case 200 is a flexible container in that (by contraction or expansion of the end walls 212) the size of the chamber 203 is variable to at least some degree even when the case 200 is closed. In this example, the flexible end walls 212 are provided by a fabric material, but in other embodiments, the end walls 212 can be made of leather, flexible polymeric plastics sheet material, or any other suitable webbing material.

To enable hinged movement of the front wall 206 and the rear wall 209 relative to a common bottom edge at which they are connected, each end wall 212 has a preformed fold 215 that defines a line at which the respective end wall 212 folds inwards towards the chamber 203 responsive to movement of the front wall 206 and the rear wall 209 towards one another.

Each end wall 212 has mounted thereon a charging contact 202 in the form of a metal piece fastened to the flexible sheet material of the end wall 212 in a central position at a top edge of the end wall 212, coinciding with the preformed fold 215. The charging contact 202 thus correspond in position and physical function (e.g., facilitating folding of the flexible end wall 212) to analogous metal details often provided on similar end flaps on flexible cases for holding conventional non-smart glasses.

Figure 6:
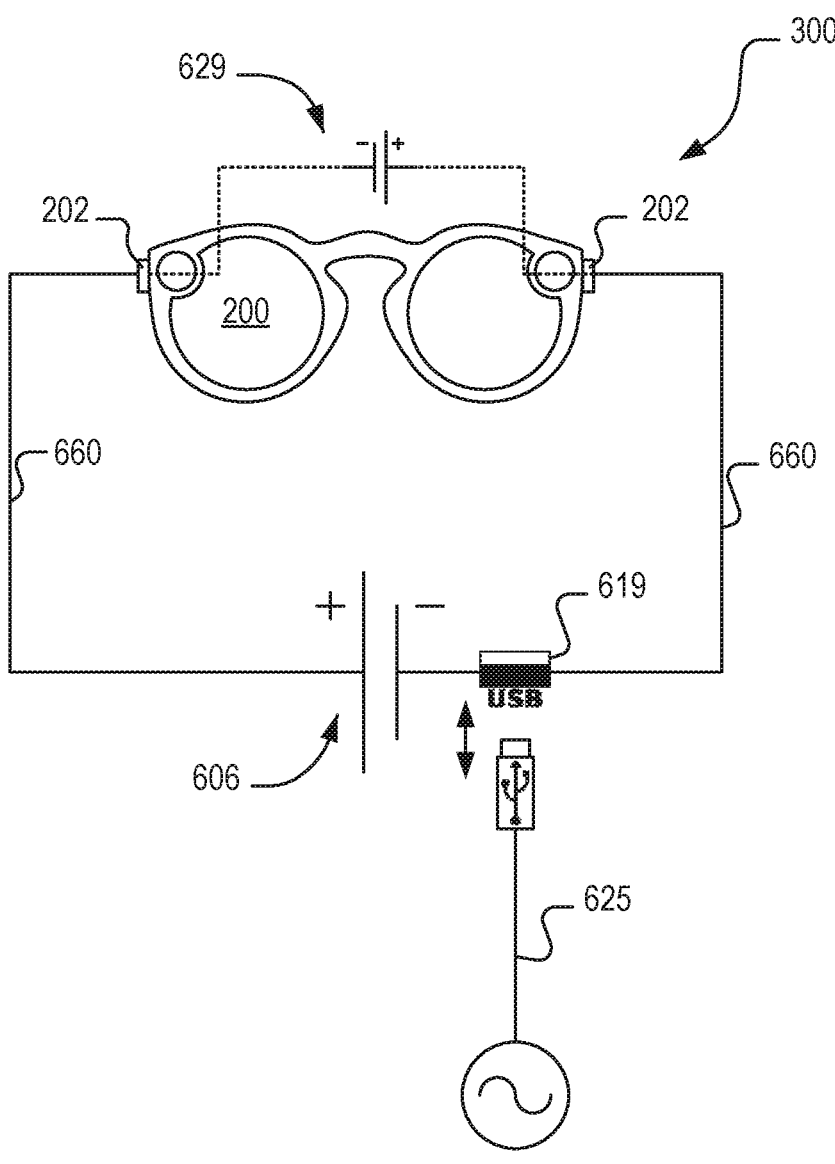
FIG. 6 is a highly simplified schematic circuit diagram showing charging circuitry forming part of a carry case and a complementary eyewear device, according to an example embodiment.

The contacts 202 in this example embodiment, however, perform the additional function of establishing a charging coupling with the glasses 100 when the glasses 100 are received in the chamber 203. To this end, each charging contact 202 is conductively connected to a power arrangement in the form of a portable battery 606 (FIG. 6).

In this example embodiment, the battery 606 is housed by the rear wall 209 of the case 200 such that no part of the battery 606 is exposed to the exterior of the case 200. The battery 606 is conductively coupled to both of the charging contacts 202 such that they have opposite polarities, as shown schematically in FIG. 6. In this example embodiment, each charging contact 202 is connected to the battery 606 by a respective conductive path (660, FIG. 6) that is formed at least in part by the fabric material of the corresponding end wall 212. To this end, each end wall 212 is in this example embodiment constructed from metalized conductive fabric material commercially available from Laird PLC. The remainder of each conductive path is formed by a flexible conductive cabling connected between the battery 606 and the respective end wall 212 and hidden below an outer leather covering layer of the case 200.

Figure 5:
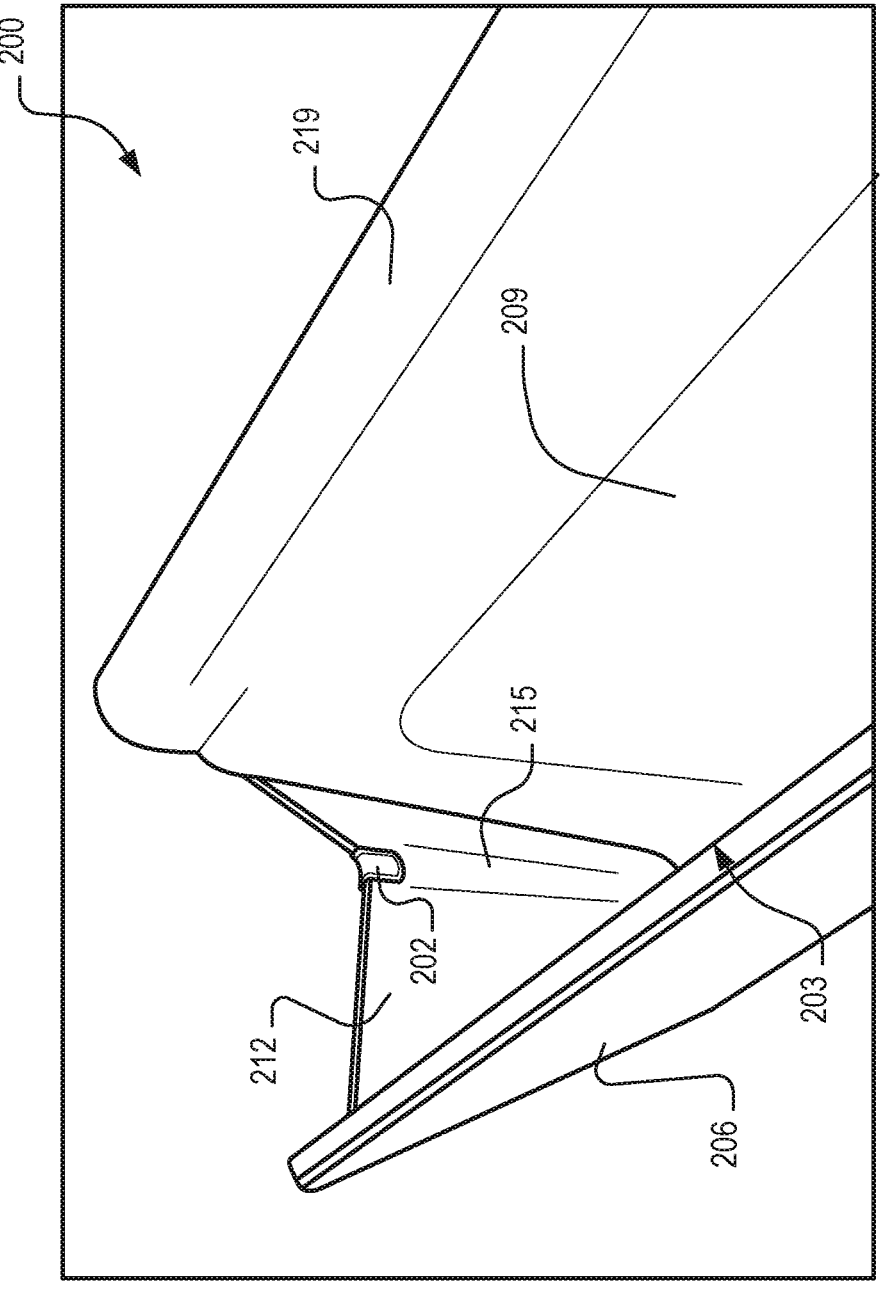
FIG. 5 is a three-dimensional view of an interior of the carry case of FIG. 2, according to an example embodiment.

In this example embodiment, each charging contact 202 is of composite construction, comprising a magnetic element for causing magnetic connection of the charging contact 202 to a metallic contact surface exposed on the exterior of the glasses 100 when they are in the collapsed mode (e.g., FIGS. 3 and 4), the charging contact 202 having an electrically conductive outer layer provided by a conductive metal coating deposited on the core magnetic element. In other embodiments, the charging contacts 202 may be of a ferromagnetic material (or may include a ferromagnetic element), while a magnetic element may be provided in association with the contact surface of the glasses 100 (e.g., an exposed portion of the hinge assemblies 309 are shown in FIG. 3). In one such example embodiment, a metal-plated magnet may be provided on the exterior of the glasses 100 to provide a contact formation for magnetically facilitated contact charging connection with respective charging contacts 202. As shown in FIG. 5, each charging contact 202 has an exposed metal contact surface on the inner surface of the end wall 212, facing towards the chamber 203.

Turning now to FIG. 3, therein is shown the kit 100 in a charging configuration, in which the glasses 100 are received and held in the storage chamber 203, with both charging contacts 202 being engaged with the glasses 100 to be in electrically conductive connection with the onboard electronics 124 in general and, in particular, with the onboard battery of the glasses 100. As can be seen in FIG. 3, the charging contact surfaces of the glasses 100 are in this example embodiment provided by hinge assemblies 309 providing articulated connections between the respective temples 109 and their corresponding end pieces 121 on the frame 106 of the glasses 100.

In particular, the hinge assemblies 309 are shaped and positioned such that when the glasses 100 are in the collapsed mode, knuckles or loops 313 of the hinge assemblies 309 are exposed to the exterior of the glasses 100 and are located at the lateral extremities of the frame 106 (see, e.g., FIG. 4) for direct contact engagement access by the respective charging contacts 202. The contact formations of the glasses 100 are thus in this example embodiment provided by the hinge loops 313 of the glasses' hinge assemblies 309. The hinge loops 313 are moreover conductively connected to the onboard battery of the glasses 100, to enable recharging of the onboard battery via the contact connection at hinge assemblies 309 (see, in this regard, FIG. 6).

Moreover, as can most readily be seen in FIG. 3, the charging contacts 202 on the end walls 212 of the case 200 are positioned such as to be more or less in register with the hinge assemblies 309 of the glasses 100, when the glasses 100 are located in the chamber 203 in an upright orientation in which an upper edge of the frame 106 is outermost. Note that the hinge assembly 309 is located more or less centrally in the width dimension of the chamber 203 (see, e.g., FIG. 4), so that the charging contact 202 would be in register with the hinge assembly 309 even if the orientation of the glasses 100 were reversed such that the frame 106 abuts against the rear wall 209 instead of against the front wall 206 (while maintaining the upright orientation of FIG. 3). As a result, insertion of the glasses 100 in the chamber 203 in either upright orientation results in virtually automatic contact engagement of the charging contacts 202 with the respective hinge assemblies 309, facilitated by magnetic interaction between them.

Figure 9A:
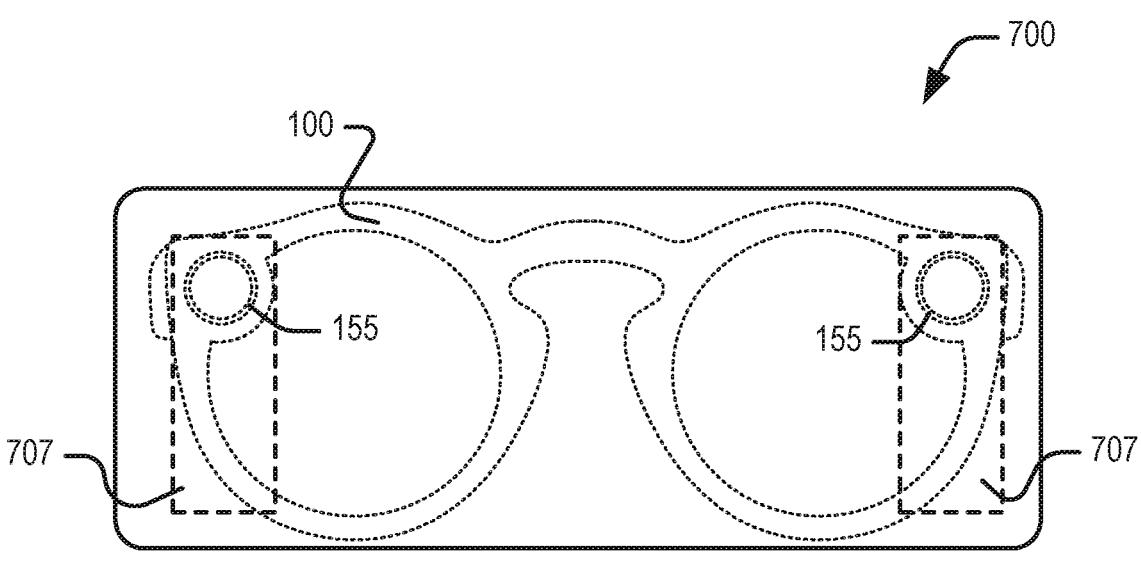
FIGS. 9A and 9B are respective schematic side views of the kit according to the example embodiment of FIGS. 8A and 8B, with the eyewear device in FIG. 9B having a vertical orientation opposite to its vertical orientation in FIG. 9A.
Figure 9B:
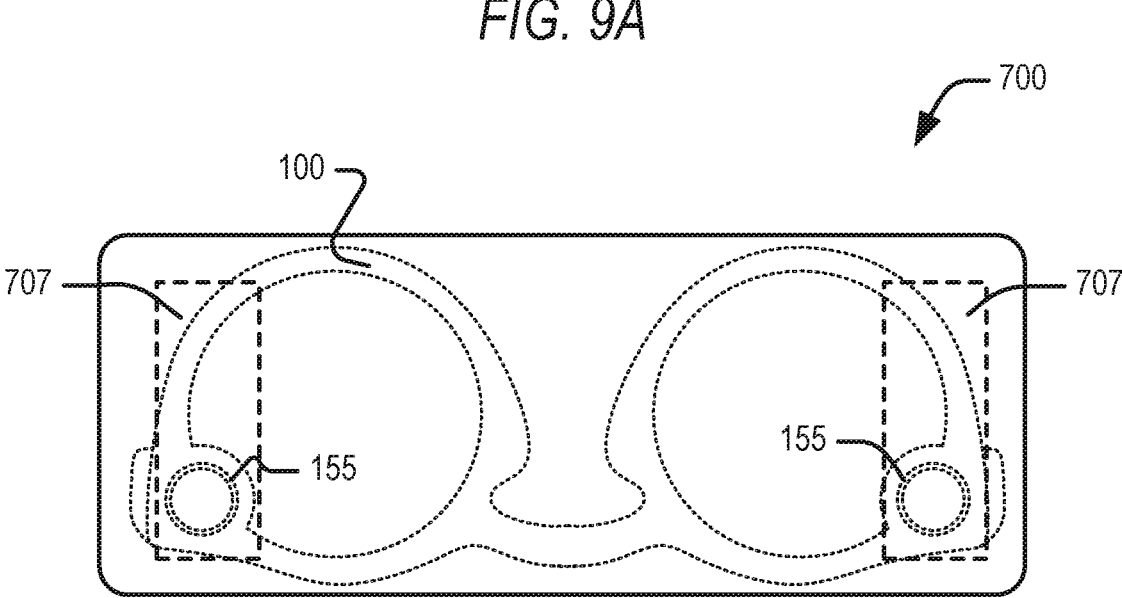

Note again that, in this description, the terms horizontal orientation and vertical orientation are used for relating different orientations of the eyewear device 100 relative to the case 200 or other container in which it is received, and is agnostic as to the orientation of the eyewear device 100 in relation to the Earth's gravity field. Thus, two opposite horizontal orientations indicate respective orientations in which the eyewear device 100 is rotated through about 180° about an upright or substantially vertical axis (as previously defined with respect to the eyewear device geometry), so that the front surface 134 of the frame 106 faces in opposite directions in the respective orientations, while the top surface of the frame 106 retains a particular orientation. Analogously, two opposite vertical orientations indicate respective orientations in which the eyewear device is rotated about 180° around an axis extending in the fore and aft direction of the eyewear device 100, so that the front surface 134 of the frame 106 faces in substantially the same direction in the respective orientations, while the top of the frame 106 faces in substantially opposite directions. (FIGS. 9A and 9B show two different vertical orientations of device).

Certain aspects of a charging mechanism incorporated in the case 200 are shown in FIG. 6, which illustrates a highly simplified circuit diagram of the kit 100 during charging of the glasses 100. As discussed previously, the battery 606 of the case 200 is conductively coupled to both of the charging contacts 202. In this example embodiment, the battery 606, charging contact 202, and the conductive paths 660 between them together form an interrupted charging circuit that can be completed by the glasses 100 via contact engagement of the respective hinge assemblies 309 with the corresponding charging contacts 202.

As shown schematically in FIG. 6 in broken lines, the onboard electronics 124 of the smart glasses 100 includes charging circuitry connecting both of the hinge assemblies 309 to the onboard battery 629 of the smart glasses 100. This internal charging circuitry is configured to cause charging of the onboard battery 629 when a voltage difference with the illustrated polarity is applied over the hinge assemblies 309.

As shown schematically in FIG. 6, the case battery 606 is connected to a charging port 619 incorporated in the case 200. The charging port 619 is in this example embodiment accessible via the exterior of the case 200, being located below the bottom edge of the case. The case 200 thus includes a charging circuit option for the case battery 606, in this example embodiment by connection to the mains power via a charging cable 625 removably connectable to the charging port 619. In some embodiments, the charging circuit of the case 200 is configured such that connection to mains power via the charging port 619 while the glasses 100 are connected to the charging circuit (such as in FIG. 6) results in charging of the onboard battery of the glasses 100 by mains power.

In use, the case 200 can be used for the dual purposes of storing the glasses 100 protectively and of charging the onboard battery of the glasses 100 while it is being stored. When the glasses 100 are to be stored in the case 200, the user simply folds the temples 109 on to the frame 106, and then inserts the glasses 100 into the storage chamber 203 in either of the possible upright orientations. When thus inserted, the charging contacts 202 are each in register with and closely spaced from the corresponding exposed hinge assemblies 309 of the glasses 100, by virtue of the physical configuration of the case 200 and the locations of the charging contacts 202 thereon.

In many instances, each charging contact 202 then automatically closes the gap between itself and the corresponding metal hinge assembly 309 and makes contact engagement therewith through attractive magnetic action of the magnetic element forming part of the charging contact 202. In instances where such automatic contact attachment does not occur, the user can really establish a charging connection by gently nudging or biasing the respective end wall 212 inwards until the corresponding charging contact 202 snaps into contact with the metal hinge loops 313 of the registering hinge assembly 309. Such ease of docking the glasses 100 in the case 200, and the relatively larger margins for error in establishing the contact connections, is achieved in part by location of the charging contacts 202 on flexible walls, so that the charging contact 202 effectively provides a floating contact relative to a rigid base provided by the body of the case 200.

When the glasses 100 are thus located in the case 200 in a charging configuration in which both charging contacts 202 are conductively coupled to the respective hinge assemblies 309, the onboard battery 629 of the glasses 100 is automatically recharged by the battery 606 of the case 200 (or, if the case 200 is connected to mains power by a charging cable 625, the glasses battery 629 is recharged by mains power).

Benefits of the disclosed techniques and mechanisms include that contact coupling between the case 200 and the smart glasses 100 avoids limitations on location freedom associated with conventional contact pin charging methods. Thus, charging of the smart glasses 100 can be achieved simply by dropping the smart glasses 100 into the case 200 in either of the upright orientations discussed above.

Note that an eyewear device can be placed into the storage chamber 203 of the case 200 in four different orientations. In this example embodiment, two of these orientations provide for necessary alignment of the charging contact 202 with the protruding charging geometries of the eyewear device 100 (e.g., in the described example embodiments, the hinge assemblies 309), being those orientations in which an operatively upper surface of the eyewear device 100 is outermost. In some embodiments, the geometry of the storage chamber 203 may be such as to allow for proper reception of the eyewear device 100 in only in those orientations in which the charging contact 202 and the hinge assemblies 309 (or, in other embodiments, an analogous contact formation) are in register. An example of a carry case which provides for contact charging in any one of four different orientations is described later below with reference to FIGS. 7-11.

A further benefit of the example case 200 is that the charging contact 202 on the end walls 212 correspond to analogous metal details on existing carry cases for non-smart glasses, so that the charging facilities provided by the case 200 are nonintrusive and aesthetically pleasing.

Note that, in some embodiments, the charging contacts 202 can additionally provide the charging interface for connecting the battery 606 (FIG. 6) of the case 200 to external power. In such cases, the charging cable 625 is configured for contact engagement with the charging contacts 202. Instead or in addition, an additional metal contact pad can in some embodiments be provided on the exterior of the case 200 for contact coupling with the charging cable 625 to charge the case battery 606.

Figure 7:
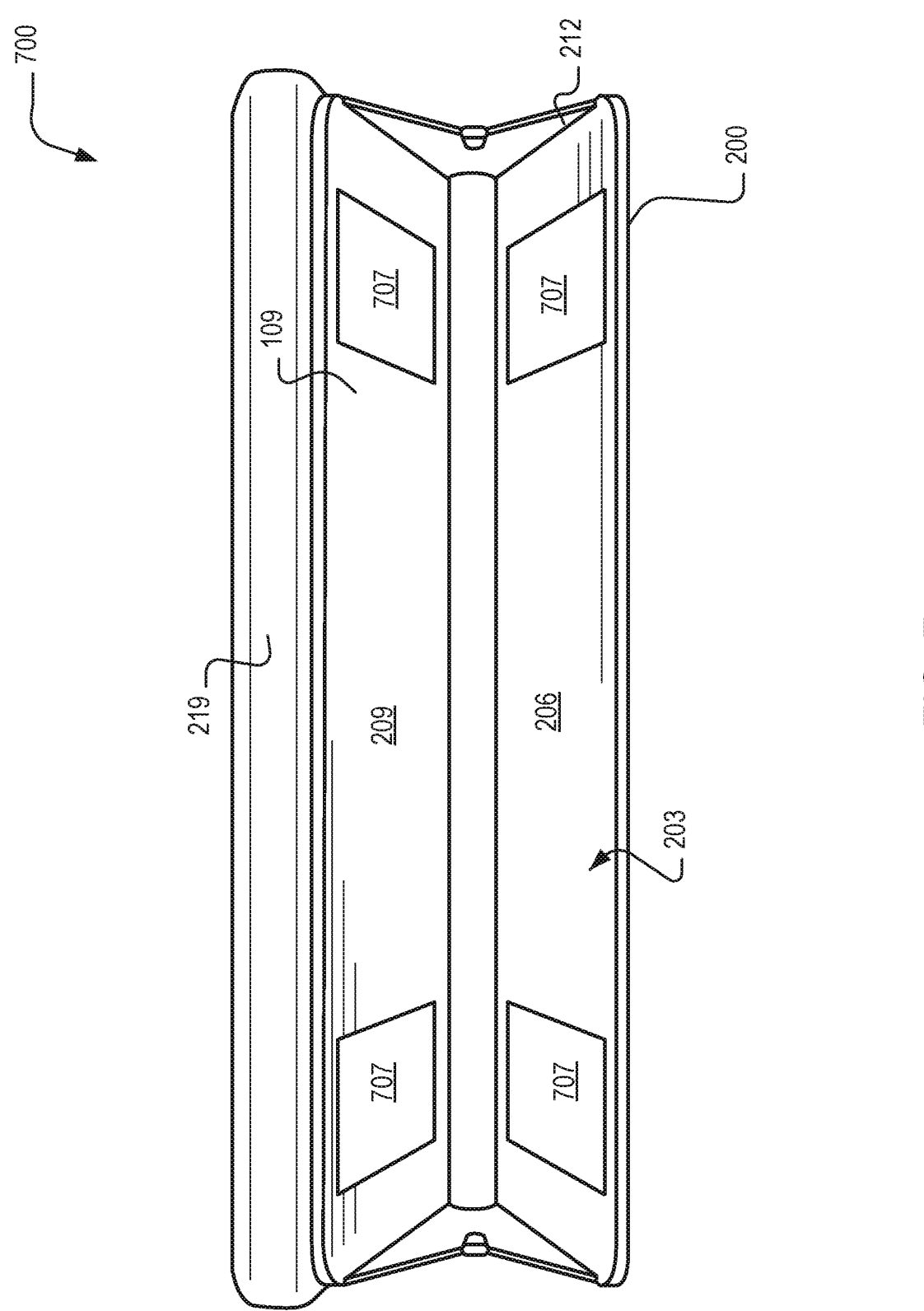
FIG. 7 is a schematic top view of a an example carry case in which contact charging elements within a storage chamber of the carry case are provided by respective contact pads, according to one example embodiment.

Turning now to FIG. 7, therein is shown another embodiment of a wallet-style carry case 700, configured for contact charging engagement with an eyewear device 100. The case 700 is largely similar to the case 200 described previously, a major distinction being that contact charging elements of the case 700 are provided by a number of contact pads 707 integrated in the case 700 to be exposed to the storage chamber 203 for engagement with contact formations provided on the front surface 134 of the frame 106 of the eyewear device 100. In particular, as will be illustrated with reference to FIGS. 8A and 8B, the contact formations of the eyewear device 100 are in this example embodiment provided by respective barrels 155 serving as trim components in the pair of camera housings 150 of the eyewear device 100.

As can best be seen in FIG. 7, each contact pad 707 provides a substantially rectangular contact surface on one of the rigid walls 206, 209 of the case 700. In this example embodiment, each contact pad 707 is an electrically conductive element that is electrically connected to the onboard battery 629 of the case 700 (see also FIG. 10) to form part of the contact charging mechanism of the case 700. To promote nonabrasive contact between the contact pads 707 and the eyewear device 100, so as to protect the eyewear device 100 from inadvertent scratching, the contact pads 707 is in this example embodiment formed from a conductive elastomeric material. Thus, in some embodiments, the contact pads 707 may be of conductive silicone (e.g. comprising a compacted silicone matrix with metal filings).

In some embodiments, the conductive contact pads 707 may, in addition to providing electrical contact surfaces, provide respective thermally conductive heatsink elements. To this end, the contact pads 707 can in some embodiments be of a thermally conductive material, for example a thermal polymer (such as conductive polyurethane) or a silicon-based material that is both electrically and thermally conductive. In such cases, the contact pads 707 contribute to the heat management of the eyewear device 100 and/or the case 700 during charging. It will be appreciated that the surface area of the contact pads 707 is significantly larger than the contact area between the trim barrels 155 and the contact pads 707, so that heat generated by onboard electronics of the eyewear device 100 and/or the contact charging process is spread out over a larger cooling area provided by the contact pads 707. In some embodiments, heat generating components in the eyewear device 100 may be connected to the barrels 155 for such heat management purposes. Moreover, the contact pads 707 are exposed to air inside the storage chamber 203, which assists in heat dissipation of the system via the contact pads 707.

Figure 8A:
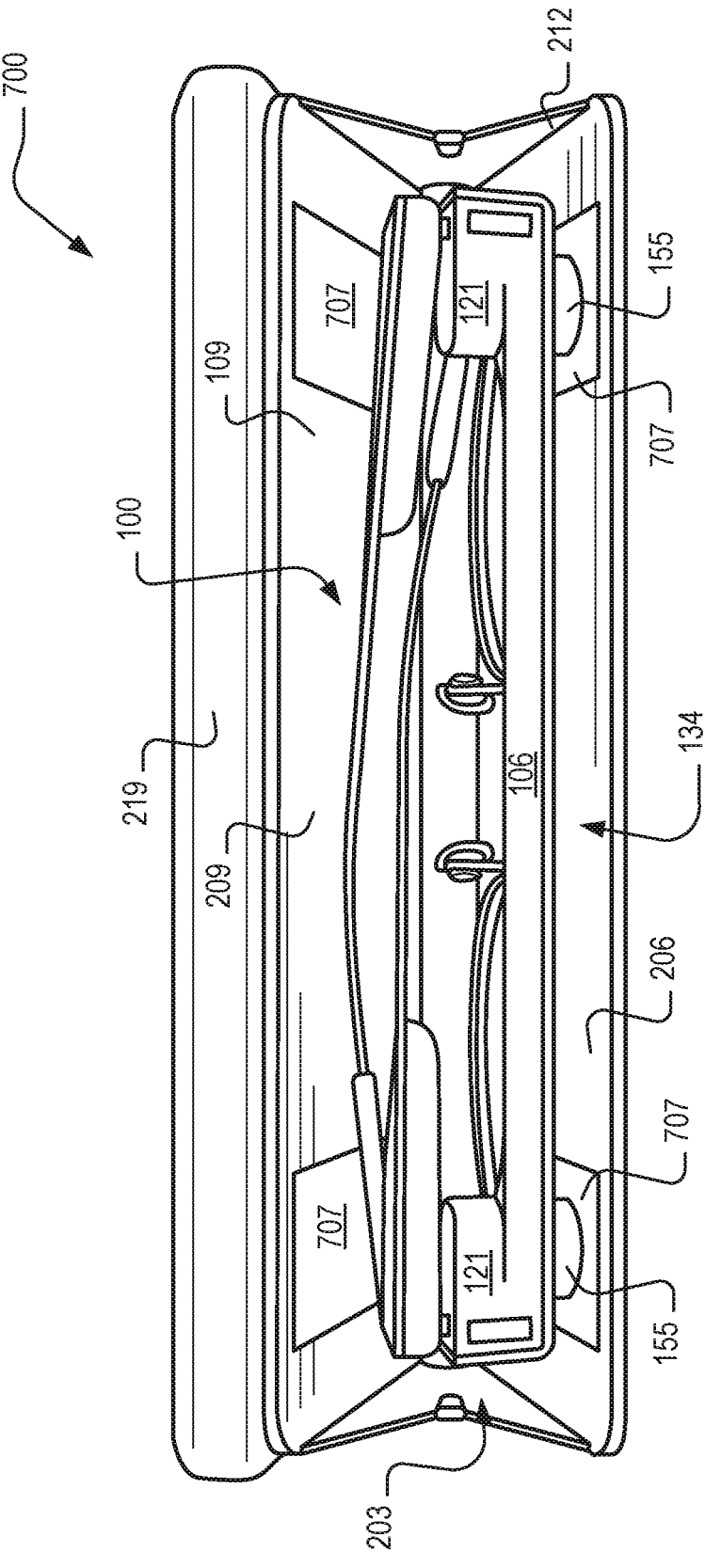
FIGS. 8A and 8B are respective top views of a kit comprising an eyewear device received in respective charging orientations in a carry case according to the example embodiment of FIG. 7, with the eyewear device in FIG. 8B having a horizontal orientation opposite to its horizontal orientation in FIG. 8A.
Figure 8B:
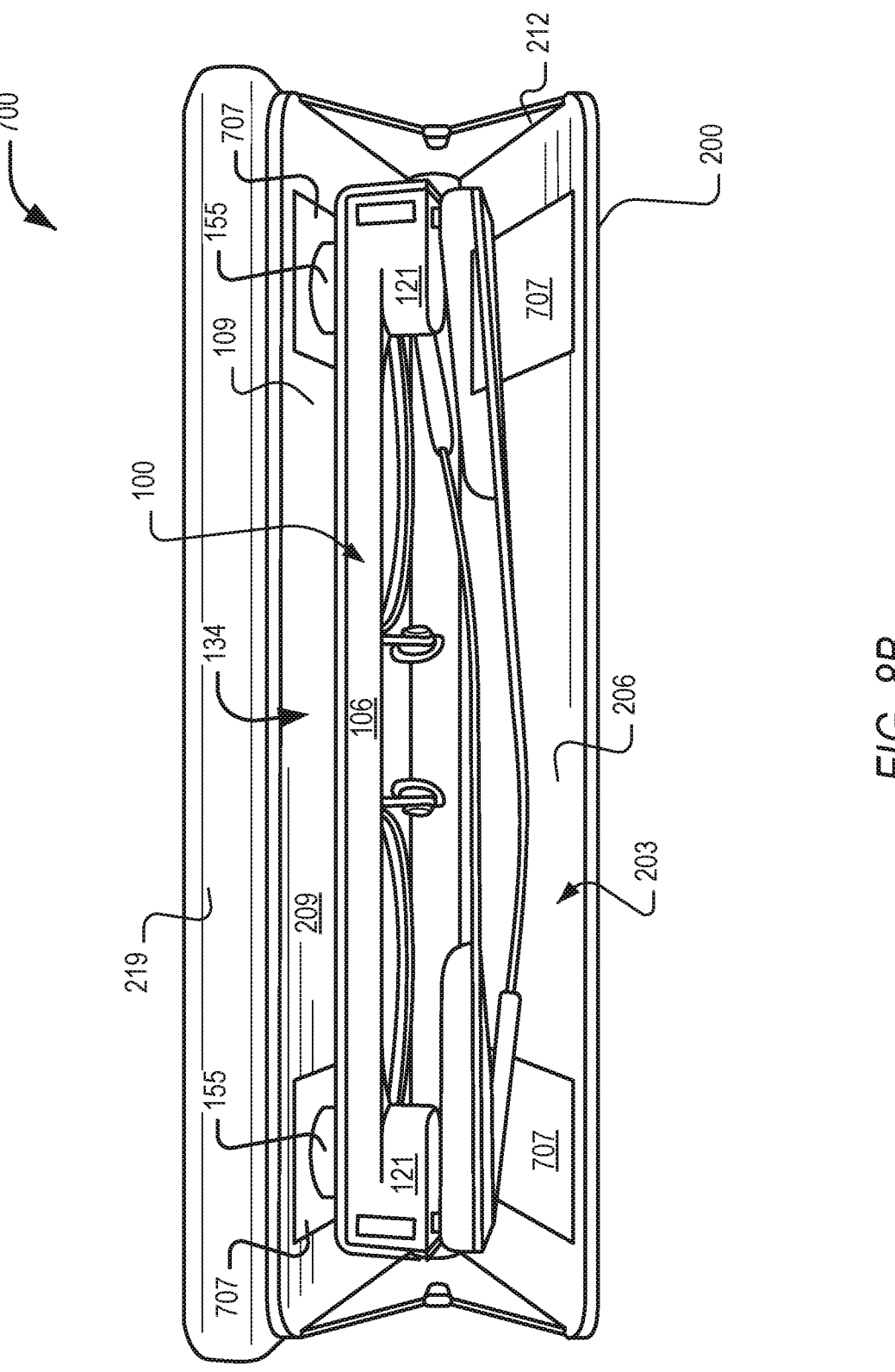

The positioning of the contact pads 707 in the case 700 is such as automatically to cause alignment of the contact pads 707 with respective charging formations on the eyewear device 100 when the eyewear device 100 is placed in the storage chamber 203. In this example embodiment, in which the camera housing barrels 155 provide the contact formations on the eyewear device 100, the lateral spacing between the contact pads 707 corresponds to the lateral spacing between the barrels 155. As can be seen in FIG. 8A, positioning of the eyewear device 100 in the storage chamber 203 thus automatically results in each of the camera housing barrels 155 bearing against a respective one of the contact pads 707, to enable charging by the contact interface.

In this example embodiment, a pair of contact pads 707 is provided on both the front wall 206 and the rear wall 209 of the case 700 (see FIG. 7). This enables charging of the eyewear device 100 in either one of two different horizontal orientations, in which the front surface 134 of the eyewear device 100 faces towards different walls 206, 209 of the case 700. Thus, in FIG. 8A the charging barrels 155 are in contact charging engagement with the contact pads 707 provided on the front wall 206, while in FIG. 8B the charging barrels 155 are shown as being in contact charging engagement with the contact pads 707 provided on the opposite, rear wall 209.

A vertical extent of each of the contact pads 707 (i.e., the dimension of the contact pad 707 substantially normal to the lengthwise direction of the storage chamber 203) is sufficient to enable automatic overlap between the contact pad 707 and the respective charging barrel 155 regardless of the vertical orientation of the eyewear device 100. FIGS. 9A and 9B schematically illustrate this feature. In FIG. 9A, the eyewear device 100 has an upright orientation, and in FIG. 9B, the eyewear device has an opposite, inverted vertical orientation. In both of these orientations, however, the charging barrels 155 are each in contact with a respective contact pad 707. A combination of, on the one hand, FIGS. 8A and 8B and, on the other hand, FIGS. 9A and 9B, illustrates that the eyewear device 100 is receivable for automatic contact charging in the case 700 in any one of four different orientations.

Figure 10:
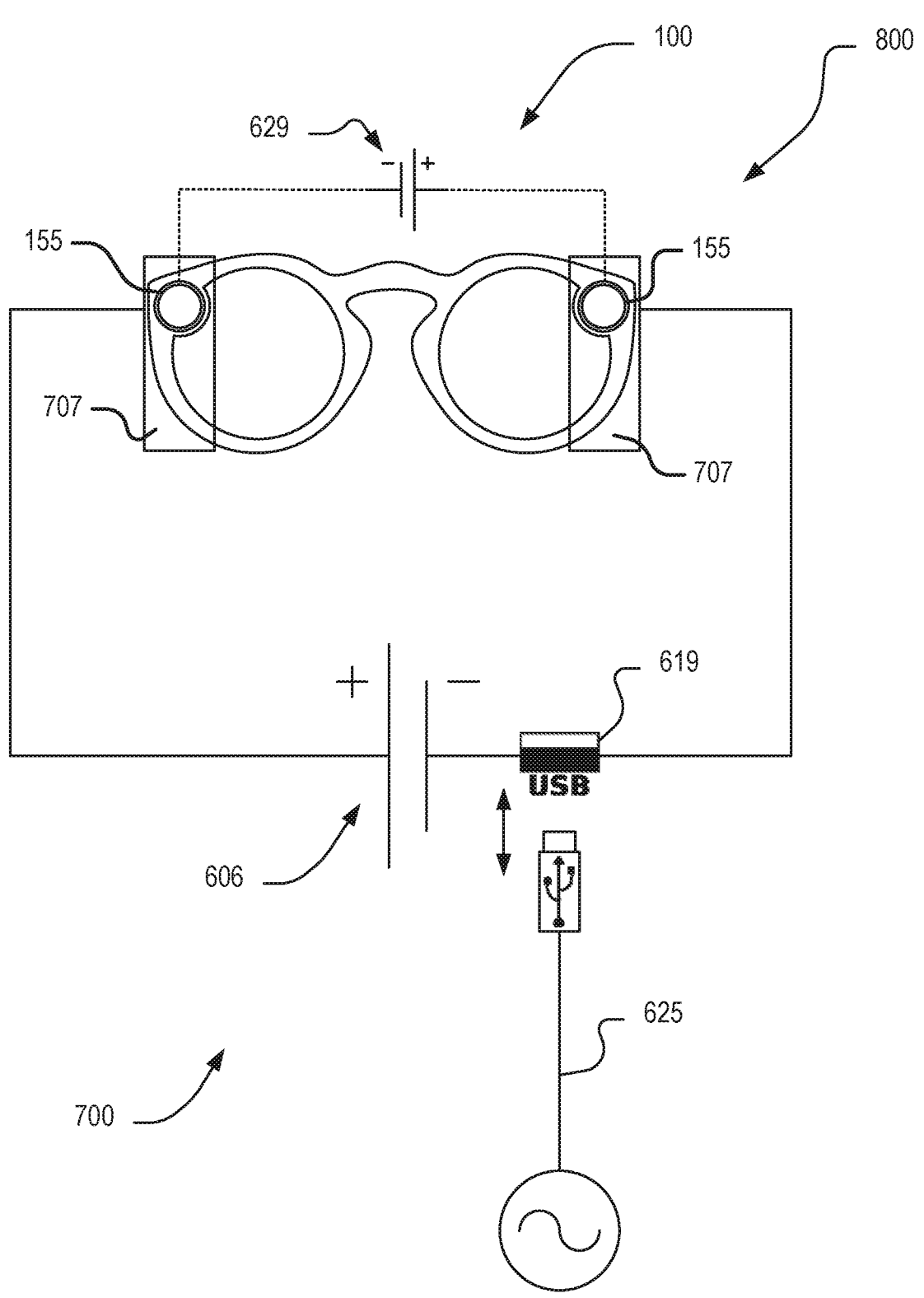
FIG. 10 is a highly simplified schematic circuit diagram showing charging circuitry forming part of the carry case and eyewear device according to the example embodiment of FIG. 7-9.

FIG. 10 shows a simplified charging diagram for a kit 800 provided by the eyewear device 100 and the carry case 700, as described above. The charging diagram of FIG. 10 corresponds to the earlier-described diagram of FIG. 6, with the difference that charging contact between the charging circuitry of the eyewear device 100 and the case 700 is provided via the contact pads 707.

Figure 11:
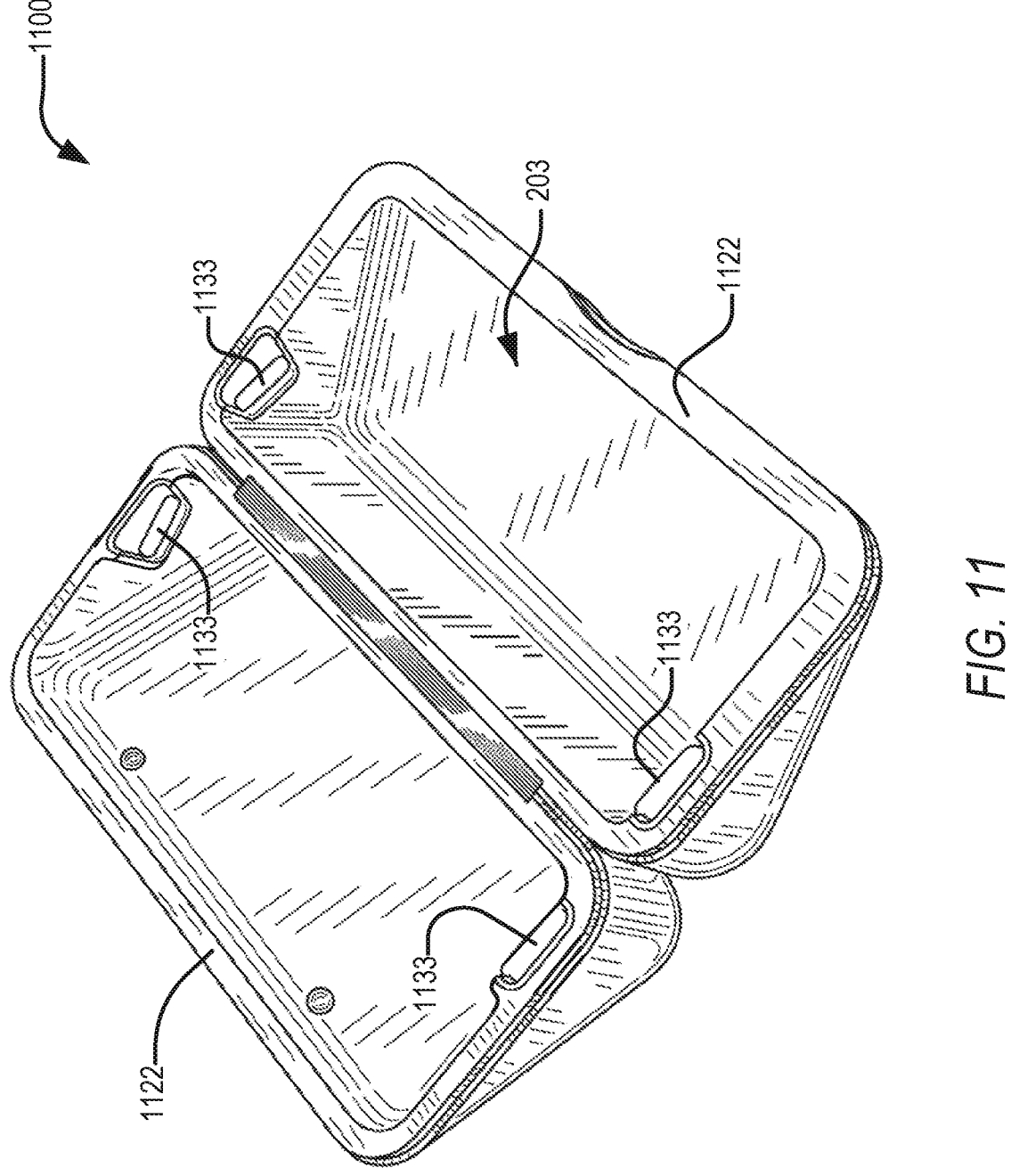
FIG. 11 is a schematic three-dimensional view of an example eyewear carry case that has a substantially rigid body, according to an example embodiment.

FIG. 11 shows an example embodiment of a rigid clamshell-type carry case 1100 that provides contact charging functionality similar to that described earlier with reference to FIGS. 1-10. The case 1100 has a pair of substantially rigid halves 1122 that are hingedly connected to allow opening and closing of a substantially fixed-shape storage chamber 203 defined between the two halves 1122. In this example embodiment, the case 1100 is configured for charging storage of the example eyewear device 100 that allows for charging through exposed frame-mounted charging formations in the form of the charging barrels 155. Charging circuitry and functions of the case 1100 not explicitly described with reference to FIGS. 11-13 are in this example embodiment identical or analogous to those features described with reference to FIGS. 7-10.

In the example embodiment of FIG. 11, contact charging elements of the case 1100 are provided by respective contact charging terminals 1133 incorporated in rigid end walls of the case 1100. Each of the halves 1122 defines a respective pair of charging terminals 1133 located at opposite lateral ends of the storage chamber 203. In this example embodiment, the eyewear device 100 is sized and shaped such that when it is inserted in the storage chamber in the folded configuration such that rear portions of the end pieces 121 rest on one pair of charging terminals 1133, the opposite pair of charging terminals 1133 are brought into contact with the charging barrels 155 when the case 1100 is closed. In this example embodiment, the case 1100 is reversible, in that the eyewear device 100 can be placed face-up in either of the halves 1122. In other embodiments, however, only one of the halves 1122 can provide charging terminals 1133, while the other half 1122 defines locating formations for supporting the eyewear device 100 face-up in a position for automatic contact charging engagement with the charging terminals 1133 when the case 1100 is closed.

Figure 12:
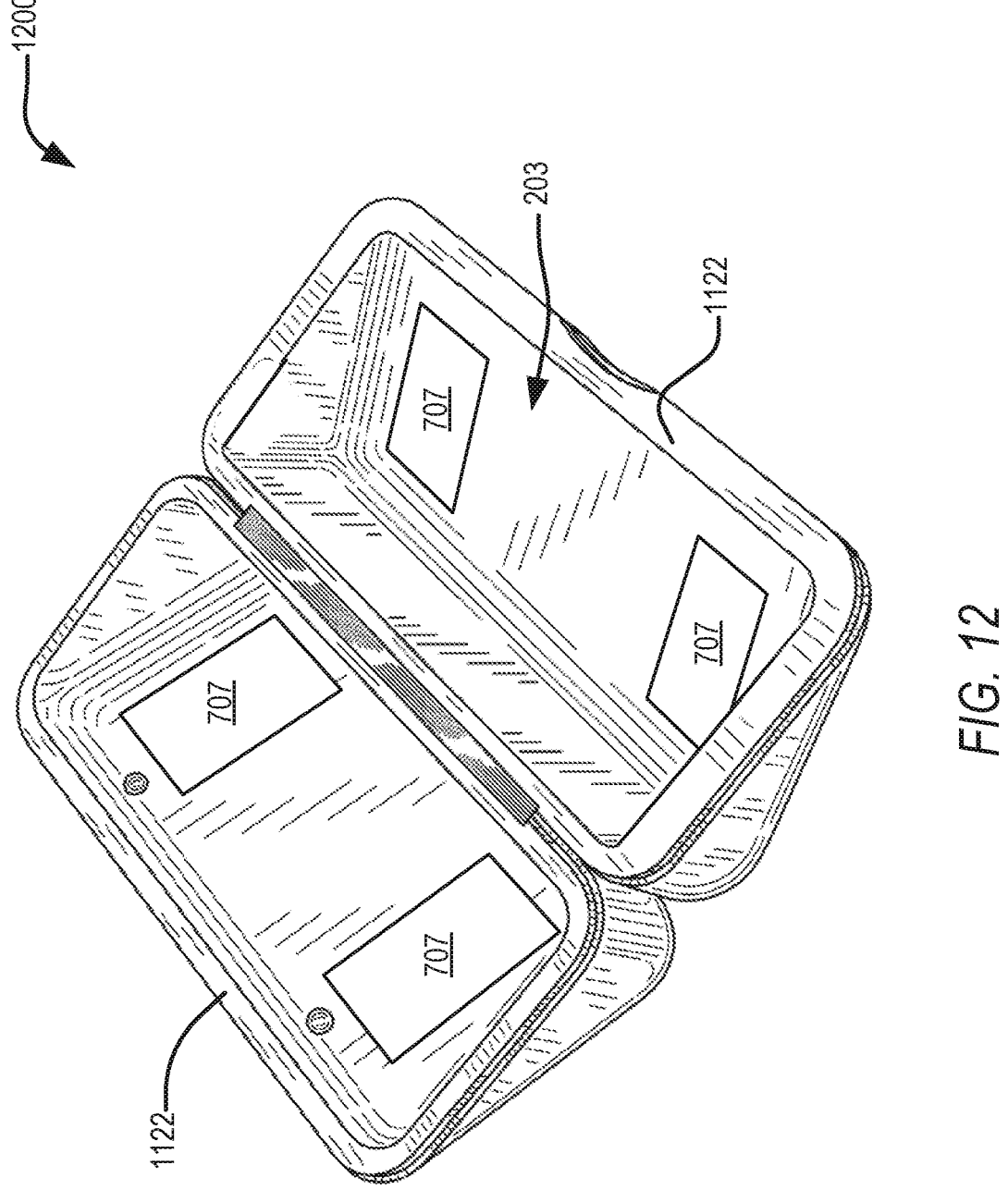
FIG. 12 is a schematic three-dimensional view of an eyewear charging case that has a substantially rigid body, according to an example embodiment.
Figure 13:
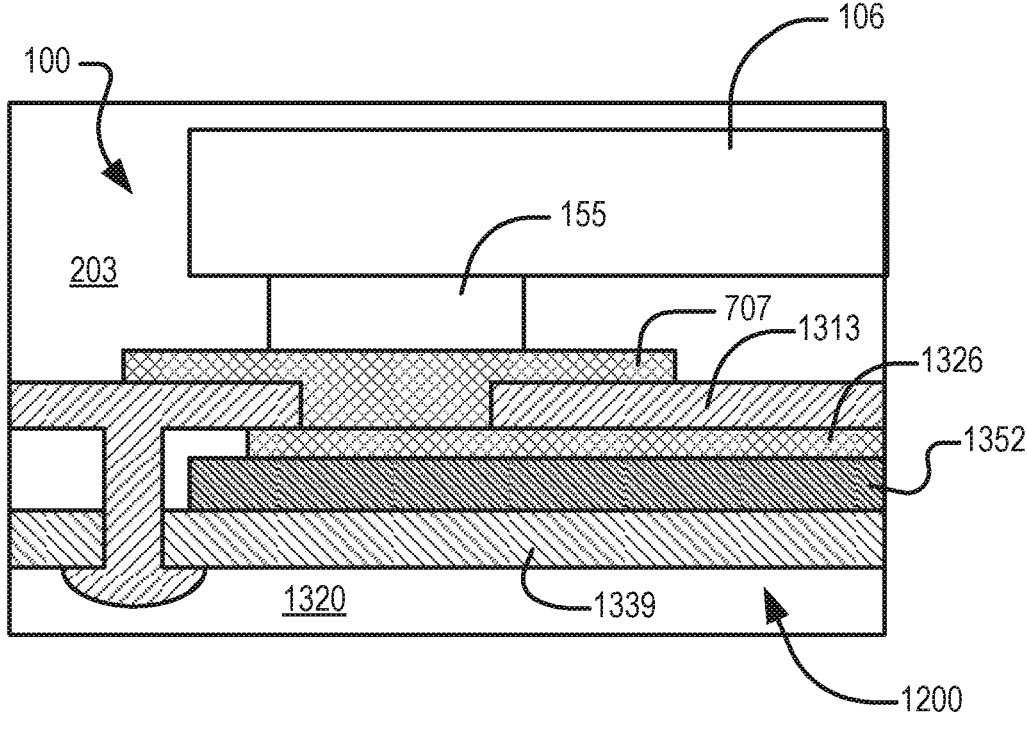
FIG. 13 is a cross-sectional view of a contact charging interface forming part of a carry case according to the example embodiment of FIG. 11 or FIG. 12.

FIG. 12 shows a further example embodiment of a rigid carrying case 1200 with a contact charging mechanism arranged for automatic engagement with contact formations on an eyewear device 100 inserted in the case 1200. Example embodiment of FIG. 12 is again configured for contact charging through the metal barrels 155 protruding from the front surface 134 of the frame 106 on the eyewear device 100. A difference, however, between the previously described case 1100 of FIG. 11, and the case 1200 is that contact charging elements of the case 1200 are provided by comparatively large contact charging surfaces or contact pads 707. The contact pads 707 of the device 1200 are in some embodiments similar to those described with reference to the example embodiment of FIG. 7-10, and the features described therein apply by extension to the example embodiment of FIG. 12.

In this example embodiment, the contact pads 707 are shown as being provided on the respective interior walls of the case halves 1122, being substantially coplanar with the respective case walls. In other embodiments, however, the contact pads 707 may be provided on prominences or protuberances defined by the interior of the case 1200. It will be appreciated that the shape and size of such prominences can be determined at design-time based on the shape and size of the complementary eyewear device 100, to ensure automatic and reliable contact engagement between the charging barrels 155 and the contact pads 707.

Instead, or in addition, the case 1200 can in other embodiments include locating formations (analogous to the contact charging terminals 1133 of FIG. 11) for seating the eyewear device 100 in an orientation and position such as to promote contact engagement with the contact pads 707 when the case 1200 is closed. In yet further embodiments, a combination of the charging terminals 1133 of FIG. 11 and contact pads 707 of FIG. 12 can be provided. In such instances, the positioning of the case's charging elements can be similar or analogous to the charging terminals 1133 of FIG. 11, while having respective surface areas closer to those of the contact pads 707 of FIG. 12.

As discussed previously with respect to the example embodiment of FIGS. 7-10, the contact pads 707 can be of a scratch-limiting material, such as a conductive fabric or a conductive elastomer. FIG. 13 shows a cross-sectional view on an enlarged scale of a contact charging interface between the eyewear device 100 and the charging case 1200 of the example embodiment of FIG. 12. The features illustrated in FIG. 13 can apply, with the necessary changes, to the charging case 1100 of FIG. 11 as well.

The contact charging element provided by the contact pad 707 is mounted on a hard inner shell 1313 that defines the interior wall of a respective one of the case halves 1122. In this case, each half 1122 is of double-shell construction, so that a housing cavity 1320 is defined between the inner shell 1313 and an outer shell (not shown) of the case 1200. A printed circuit board (PCB) 1352 is mounted inside the housing cavity 1320, being held in position by a retaining plate 1339 attached to the inner shell 1313. A conductive interface 1326 is located inside the housing cavity 1320, being parallel to and in face-to-face abutment with the PCB 1352. The conductive interface 1326 is in both thermally and electrically conductive connection with the contact pad 707, which is located on the outer face of the inner shell 1313, thus being exposed to the storage chamber 203. Note that the contact pads 707, the inner shell 1313, the conductive interface 1326, the PCB 1352, and the retaining plate 1339 thus in this example embodiment form a laminated structure in which the different layers are arranged in planar abutment.

In use, the metal charging barrel 155 is substantially flush abutment with the contact pad 707, establishing a contact interface for transferring both heat and electrical current from the eyewear device 100 to the contact pad 707. The PCB 1352 is likewise connected for transfer of heat and electrical current to the contact pad 707 via the conductive interface 1326 (which is in this example embodiment of a material identical to the contact pad 707 and which may in some embodiments be of one-piece construction with the contact pad 707). Thus, during charging, electrical current to charge the eyewear device 100 is transmitted via the conductive interface 1326 and the contact pad 707 to the eyewear device 100. At the same time, a thermally conductive path is established with the contact pad 707 to transfer excess heat to the contact pad 707 to help spread heat energy generated during charging events. Note that the contact pad 707 can serve as a heat sink for either the eyewear device 100 or for the PCB 204, or for both.

It is a benefit of the example cases 1100 and 1200, in comparison to existing fixed-shape charging cases, that it obviates problems created by existing contact pin charging methods, which has strict conditions on location freedom. Such positive engagement charging mechanisms require precise location control between mating geometries of both charging case and eyewear device. Such restrictions limit design options and enforces engineering compromises, as well as placing a user-experience constraint and placement of the eyewear device inside the case to ensure proper charging. Defined differently, existing charging mechanisms necessitate placement of the eyewear device in its case at a precise orientation with a high level of positional accuracy.

Thus, a user can insert the eyewear device 100 in the case 1100/1200 for charging by simply dropping the eyewear device 100 in one of two different orientations (in which the front surface 134 of the eyewear device 100 is directed to different case halves 1122). Unlike existing cases, the user need not be concerned with how well the eyewear device 100 is seated inside the case 1100/1200 in order to effect proper charging engagement.

Moreover, the provision of contact charging elements in the case 1100/1200 provides for reduced design constraints on charging geometry, when compared to the more precise requirements of positively engaged contact pins. Yet a further benefit is lower manufacturing costs than is the case in mechanisms using contact pins and/or locating magnets.

Note that although the charging formations of the eyewear device 100 is consistently described in the example embodiments of FIG. 7-13 as being provided by the charging barrels 155, the charging formations can in other embodiments be provided by different conductive features exposed on an exterior of the eyewear device 100. To allow for charging in at least two different orientations, such conductive features are in many embodiments laterally symmetrical and are exposed on the front surface 134 of the eyewear frame 106.

Recapitulation of Selected Example Embodiments

It will be seen that the description and drawings illustrate a number of embodiment, including but not limited to the numbered list of examples that follows.

Example 1: A carry case for an electronics-enabled eyewear device, the case comprising:

a case body that defines a storage chamber for holding an eyewear device;

a power arrangement configured to provide electrical power for charging an onboard battery of the eyewear device while the eyewear device is held in the storage chamber; and a contact charging mechanism that provides one or more contact charging elements mounted on the case body in exposure to the storage chamber for contact engagement with a contact formation on the eyewear device, the one or more contact charging elements being conductively connected to the power arrangement to enable charging of the eyewear device via the contact charging mechanism.

Example 2: The carry case of example 1, wherein the contact charging mechanism comprises two separate contact charging elements defining respective contact surfaces for contact engagement with separate respective contact formations incorporated in the eyewear device.

Example 3: The carry case of example 2, wherein the two separate contact charging elements are mounted on respective flexible walls that form part of the case body and that at least partially defines the storage chamber.

Example 4: The carry case of example 1, wherein the one or more contact charging elements are mounted on a rigid wall that forms part of the case body and that at least partially defines the storage chamber.

Example 5: The carry case of example 4, wherein the case body is substantially rigid.

Example 6: The case of example 2, wherein:

the power arrangement comprises a battery housed by the case body; and the separate contact charging elements are connected to the battery such as to have opposite polarities during charging of the eyewear device.

Example 7: The carry case of example 6, wherein the battery is connected by respective conductive paths to the contact charging elements such as to form an interrupted charging circuit that is closable by insertion of the eyewear device in the storage chamber such that each contact charging element of the case is coupled with a respective contact formation on the eyewear device.

Example 8: The carry case of example 2, wherein the contact charging elements are provided by at least two contact pads mounted on an internal wall of the storage chamber, each contact pad defining a respective contact surface that is greater in area than the corresponding contact formation of the eyewear device.

Example 9: The carry case of example 8, wherein the contact charging mechanism comprises two pairs of contact pads mounted on opposite internal walls of the storage chamber, such that a pair of contact formations on a common side of the eyewear device is in register with one of the pairs of contact pads regardless of which one of the opposite walls bears against a front side of the eyewear device.

Example 10: The carry case of example 8, wherein the at least two contact pads comprises a pair of contact pads mounted on a common internal wall of the storage chamber for engagement with a pair of contact formations on a common side of the eyewear device, each of the pair of contact pads having a vertical extent sufficient to allow for contact engagement between the pair of contact pads and the pair of contact formations in either an upright or an inverted orientation of the eyewear device in the storage chamber.

Example 11: The carry case of example 1, wherein the contact charging mechanism is configured for allowing contact engagement between the contact charging mechanism and the eyewear device in any one of two different orientations of the eyewear device in the storage chamber.

Example 12: The carry case of example 1, wherein the contact charging mechanism is configured for allowing contact engagement between the contact charging mechanism and the eyewear device in any one of four different orientations of the eyewear device in the storage chamber.

Example 13: A kit comprising:

an eyewear device disposable between a wearable mode and a collapsed mode, the eyewear device comprising:

onboard electronics;

an onboard battery connected to the onboard electronics for providing electrical power thereto; and a contact formation conductively coupled to the onboard battery for enabling charging of the onboard battery by an external power source via connection to the contact formation, the contact formation being exposed to an exterior of the eyewear device, at least when the eyewear device is in the collapsed mode; and a portable case for the eyewear device, the portable case comprising:

a case body that defines a storage chamber for holding the eyewear device in the collapsed mode;

a power source housed by the case body; and a contact charging mechanism that is coupled to the power source and that provides one or more contact charging elements mounted on the case body such as to be exposed in the storage chamber for engagement with the contact formation of the eyewear device when the eyewear device is received in the storage chamber, thereby to enable charging of the onboard battery of the eyewear device via the contact charging mechanism.

Example 14: The kit of example 13, wherein each contact formation of the eyewear device is exposed on an eyewear frame that defines a pair of optical element holders for holding respective optical elements within view of a user when the eyewear device is worn.

Example 15: The kit of example 13, wherein each contact formation is a metal trim element.

Example 16: The kit of example 13, wherein each contact formation is defined on a front-facing side of the eyewear frame.

Example 17: The kit of example 15, wherein each contact formation projects forwards from the eyewear frame to stand proud of a surrounding region of the eyewear frame.

Example 18: The kit of example 15, wherein each contact formation is a barrel-shaped trim element forming part of a camera formation or pseudo-camera formation.

Example 19: The kit of example 13, wherein the power source comprises a battery connected by respective conductive paths to the contact charging elements such as to form an interrupted charging circuit that is closable by insertion of the eyewear device in the storage chamber such that each contact charging element of the case is coupled with a respective contact formation on the eyewear device at opposite lateral ends thereof.

Example 20: The kit of example 14, wherein the case and the eyewear device are configured such that reception of the eyewear device in the storage chamber automatically brings each of the contact formations on the eyewear device into register with the corresponding contact charging element of the case.

Example 21: The kit of example 20, wherein the case and the eyewear device are configured such that reception of the eyewear device in the storage chamber in either of two different orientations automatically brings each of the contact formations on the eyewear device into register with the corresponding contact charging element of the case.

Example 22: The kit of example 20, wherein the case and the eyewear device are configured such that reception of the eyewear device in the storage chamber in any one of four different orientations automatically brings each of the contact formations of the eyewear device into register with the corresponding contact charging element of the case.

Example 23: An eyewear device comprising:

a body comprising: an eyewear configured to hold one or more optical elements; and a pair of temples connected to the frame to support the eyewear frame on the face of a user, when the eyewear device is worn;

on-board electronics housed by the body and including a rechargeable onboard battery;

charging circuitry connected to the onboard battery to enable charging of the onboard battery responsive to coupling of the charging circuitry to an external power source; and one or more contact formations conductively connected to the charging circuitry for coupling the charging circuitry to an external power source by contact engagement with one or more corresponding contact charging elements, each contact formation being exposed on an exterior of the eyewear frame.

Example 24: The eyewear device of example 23, wherein each contact formation is a metal trim element.

Example 25: The eyewear device of example 23, wherein each contact formation is defined on a front-facing side of the eyewear frame.

Example 26: The eyewear device of example 24, wherein each contact formation projects forwards from the eyewear frame to stand proud of a surrounding region of the eyewear frame.

Example 27: The eyewear device of example 24, wherein each contact formation is a barrel-shaped trim element forming part of a camera formation or pseudo-camera formation.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed, is:

1. A carry case for an eyewear device having an onboard battery for powering integrated electronics of the eyewear device, the carry case comprising:

a case body that defines a storage chamber for holding an eyewear device;

a power source housed by the case body; and one or more charge pads that are electrically connected to the power source, each charge pad presenting a respective contact surface exposed to an interior of the storage chamber for engagement with a complementary contact formation of the eyewear device when the eyewear device is received in the storage chamber, thereby to enable charging of the onboard battery of the eyewear device, wherein:

each charge pad of the carry case is of a thermally conductive material that at least in part comprises a metal material; and each charge pad is configured to dissipate heat from the eyewear device during charging, such that each charge pad provides a respective heatsink element during charging.

2. The carry case of claim 1, wherein the power source is a battery integrated into the carry case.

3. The carry case of claim 1, wherein each charge pad comprises a flat pad mounted on a wall of the storage chamber.

4. The carry case of claim 1, wherein the thermally conductive material of each charge pad at least in part comprises a ferromagnetic material, such that the charge pad is configured for magnetic interaction with magnetized contact formations of the eyewear device.

5. The carry case of claim 1, wherein each charge pad at least in part comprises a thermally conductive polymer.

6. The carry case of claim 1, wherein each charge pad at least in part comprises a polymer material impregnated with a thermally conductive filler.

7. The carry case of claim 1, wherein each charge pad at least in part comprises a conductive silicone material.

8. The carry case of claim 7, wherein each charge pad is of a conductive silicone material impregnated with metal fillings.

9. A kit comprising:

an eyewear device comprising:

a frame holding onboard electronics;

an onboard battery configured to power the onboard electronics; and one or more contact formations configured to enable charging of the onboard battery when electrically connected to a power source; and a carry case for the eyewear device comprising:

a case body defining a storage chamber to hold the eyewear device;

a power source incorporated in the case body; and one or more thermally conductive charge pads that are electrically connected to the power source and that are located in the storage chamber, the one or more charge pads being configured to interface by contact with the one or more contact formations of the eyewear device, thereby to cause charging of the onboard battery of the eyewear device, wherein the one or more charge pads are configured to dissipate heat during charging, each charge pad being a thermally conductive element at least in part comprising a metal material, such that each charging pad provides a respective heatsink element during charging.

10. The kit of claim 9, wherein each charge pad presents a respective contact surface exposed to an interior of the storage chamber, the contact surface of each charge pad having a surface area larger than an area encompassed by a corresponding contact formation of the eyewear device.

11. The kit of claim 10, wherein the one or more contact formations of the eyewear device are thermally coupled to one or more heat generating components of the eyewear device, so that each charge pad is configured to provide a heatsink element for said heat generating components of the eyewear device during charging.

12. The kit of claim 10, wherein each charge pad is thermally coupled to one or more heat generating components of the carry case, so that each charge pad is configured to provide a heatsink element for said heat generating components of the carry case during charging.

13. The kit of claim 10, wherein the charge pads are configured to contact the contact formations of the eyewear device when the eyewear device is placed in the storage chamber in multiple orientations.

* * * * *